US012808764B2

(12) United States Patent
Rowland et al.

(10) Patent No.: US 12,808,764 B2
(45) Date of Patent: Nov. 24, 2026

(54) TEMPERATURE REGULATED COOLANT SYSTEM FOR ELECTRIC VEHICLES

(71) Applicant: Joby Aero, Inc., Santa Cruz, CA (US)

(72) Inventors: Robert Wilson Rowland, San Francisco, CA (US); Lucas Rybarczyk, Redwood City, CA (US); Alexander Bondarenko, San Francisco, CA (US); Paul Guerra, Redwood City, CA (US); Alireza Goshtasbi, San Jose, CA (US); Andrew William Bookholt, San Mateo, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 43 days.

(21) Appl. No.: 19/041,106

(22) Filed: Jan. 30, 2025

(65) Prior Publication Data

US 2025/0242943 A1 Jul. 31, 2025

Related U.S. Application Data

(60) Provisional application No. 63/721,491, filed on Nov. 16, 2024, provisional application No. 63/626,980, filed on Jan. 30, 2024.

(51) Int. Cl.
*G01N 9/00* (2006.01)
*B60L 58/26* (2019.01)
(Continued)

(52) U.S. Cl.
CPC ................ *G01N 9/00* (2013.01); *B60L 58/26* (2019.02); *B64F 1/35* (2024.01); *B64F 1/36* (2013.01);
(Continued)

(58) Field of Classification Search
CPC . G01N 9/00; B60L 58/26; B60L 53/16; B60L 53/60; B60L 2200/10; B64F 1/35;
(Continued)

(56) References Cited

U.S. PATENT DOCUMENTS

| | | | |
|---|---|---|---|
| 861,607 | A | 7/1907 | Pfeifer |
| 7,000,467 | B2 | 2/2006 | Chu et al. |

(Continued)

FOREIGN PATENT DOCUMENTS

| | | |
|---|---|---|
| WO | 2019217442 | 11/2019 |
| WO | 2023277852 | 1/2023 |

(Continued)

*Primary Examiner* — Michael V Kerrigan
(74) *Attorney, Agent, or Firm* — SCHWEGMAN LUNDBERG & WOESSNER, P.A.

(57) ABSTRACT

A thermal management system for electric aircraft is disclosed, designed to control the temperature of battery packs during the charging process. The system includes a thermal conditioning system for maintaining coolant at a first temperature, a coolant circulator for transferring the coolant between the thermal conditioning system and the aircraft, and a temperature adjuster for blending coolant flows to achieve a desired combined temperature. A control unit receives battery temperature information and adjusts the temperature adjuster accordingly. The system can operate in various modes, including cooling, heating, or variable temperature modes, based on target temperature parameters. The system is further configured to transition between modes in response to the battery pack's thermal requirements during charging.

20 Claims, 10 Drawing Sheets

(51) Int. Cl.

| | |
|---|---|
| ***B64F 1/35*** | (2024.01) |
| ***B64F 1/36*** | (2017.01) |
| *B60L 53/16* | (2019.01) |
| *B60L 53/60* | (2019.01) |

(52) U.S. Cl.
CPC ............... *B64F 1/362* (2013.01); *B60L 53/16* (2019.02); *B60L 53/60* (2019.02); *B60L 2200/10* (2013.01)

(58) Field of Classification Search
CPC ........ B64F 1/36; B64F 1/362; B64C 29/0016; B64D 27/34; B64D 27/357
See application file for complete search history.

(56) References Cited

U.S. PATENT DOCUMENTS

| | | | |
|---|---|---|---|
| 7,748,262 | B2 | 7/2010 | Reginaldo et al. |
| 9,557,207 | B2 | 1/2017 | Stevenson et al. |
| 11,225,156 | B2 | 1/2022 | Miller et al. |
| 11,515,586 | B2 | 11/2022 | Guerra et al. |
| 11,694,561 | B2 | 7/2023 | Petersen et al. |
| 11,728,532 | B1 | 8/2023 | Lohe et al. |
| 11,728,537 | B2 | 8/2023 | Shrivastava et al. |
| 11,801,773 | B1 | 10/2023 | Overfield et al. |
| 11,990,050 | B2 | 5/2024 | Petersen et al. |
| 2014/0014421 | A1 | 1/2014 | Carpenter et al. |
| 2017/0088007 | A1 | 3/2017 | Melendez et al. |
| 2017/0088008 | A1 | 3/2017 | Melendez et al. |
| 2023/0020687 | A1 | 1/2023 | Kim |
| 2023/0089802 | A1 | 3/2023 | Guerra et al. |
| 2023/0382250 | A1* | 11/2023 | Palombini ................ B60L 1/04 |
| 2023/0415593 | A1 | 12/2023 | Lee et al. |
| 2024/0051679 | A1 | 2/2024 | Bosson et al. |
| 2024/0075829 | A1 | 3/2024 | Rowland et al. |
| 2024/0251531 | A1 | 7/2024 | Bean, Jr. |

FOREIGN PATENT DOCUMENTS

| | | |
|---|---|---|
| WO | 2023281304 | 1/2023 |
| WO | 2024035966 | 2/2024 |

* cited by examiner

TEMPERATURE REGULATED COOLANT SYSTEM FOR ELECTRIC VEHICLES

CROSS-REFERENCE TO RELATED APPLICATION

This patent application claims the benefit of U.S. Provisional Patent Application No. 63/626,980, filed Jan. 30, 2024, entitled "TEMPERATURE REGULATED COOLANT SYSTEM FOR ELECTRIC VEHICLES" and U.S. Provisional Patent Application No. 63/721,491, filed Nov. 16, 2024, entitled "AIRCRAFT BATTERY COOLANT DENSITY MONITORING DEVICE AND AIRCRAFT BATTERY THERMAL MANAGEMENT USING DUAL PUMPS", which are incorporated by reference herein in their entireties.

BACKGROUND

The development of electric aircraft has introduced a new set of challenges and opportunities in the field of aviation. As the industry shifts towards more sustainable and environmentally friendly solutions, electric propulsion systems have become a focal point of innovation. These systems rely heavily on advanced battery technology, which necessitates efficient thermal management to ensure safety, performance, and longevity.

Traditional aircraft have used internal combustion engines that produce a significant amount of heat, which is managed through various cooling systems. However, electric aircraft present a different thermal management paradigm. The batteries used in electric aircraft are sensitive to temperature variations, and their optimal operation, charging, and discharging efficiencies are closely tied to their thermal state. Excessive heat can lead to reduced battery life and potential safety risks, while temperatures that are too low can result in decreased power output and charging rates.

The need for precise thermal management is challenging during the charging process. Rapid charging, in particular, can generate substantial heat within the battery cells, requiring a cooling system that can quickly and effectively dissipate this heat to prevent damage. Conversely, in colder environments, there may be a need to warm the batteries before charging to ensure they are within the optimal temperature range for energy intake.

The advent of electric aircraft has spurred the development of ground support equipment (GSE) that not only facilitates the charging of aircraft batteries but also actively manages their temperature during the process.

As the electric aircraft industry continues to grow, the importance of effective thermal management systems becomes increasingly apparent. Innovations in this area are needed for the advancement of electric aviation and the realization of its potential benefits, including reduced carbon emissions, lower operating costs, and the opening of new possibilities for aircraft design and functionality.

BRIEF DESCRIPTION OF SEVERAL VIEWS OF THE DRAWINGS

To easily identify the discussion of any particular element or act, the most significant digit or digits in a reference number refer to the figure number in which that element is first introduced.

DETAILED DESCRIPTION

The present disclosure relates, in some examples, to a thermal management system for electric vehicles (e.g., aircraft), which includes a diverter valve mechanism and multiple operational modes. Examples are designed to regulate the temperature of battery packs during the charging process, a factor in maintaining battery efficiency, longevity, and safety. The examples described here refer to support equipment for an electric aircraft, but the technology can be applied to support equipment for any type of electric vehicle, including electric cars.

The diverter valve controls the flow of coolant within the thermal management system. The valve is capable of diverting coolant through a heating circuit to increase the battery temperature, as required. The actuation of the diverter valve allows for the transition between cooling and heating modes, ensuring that the battery packs remain within a temperature range.

The system operates in multiple modes to accommodate the varying thermal demands of the aircraft's batteries. In the cooling mode, the diverter valve routes the coolant via a chiller (or reservoir connected to a chiller), where it is brought to a low temperature before being circulated to the batteries. Conversely, in the heating mode, the diverter valve directs the coolant to bypass the chiller (and associated reservoir) and pass through a heater, raising the coolant temperature to prepare the batteries for efficient charging or operation in cold conditions.

A variable temperature mode is also featured, wherein the diverter valve adjusts the proportion of coolant from the chiller and heater to achieve a specific temperature output.

This mode is advantageous for dynamically responding to real-time thermal requirements, providing a tailored thermal management solution.

The system's control unit, interfacing with the diverter valve, receives temperature-related data from the battery packs and the coolant circuit and adjusts the valve's position accordingly. By integrating sensor feedback and employing advanced control algorithms, the system ensures precise temperature regulation of the battery packs throughout the charging cycle.

This thermal management system, with its versatile diverter valve and adaptable modes of operation, represents an advancement in the field of electric aircraft charging technology. It offers a solution for managing the thermal challenges associated with electric aircraft batteries, for example, thereby enhancing the overall performance and reliability of electric aviation.

Ground Support Equipment (GSE) for Electric-Powered Aircraft

Figure 1:
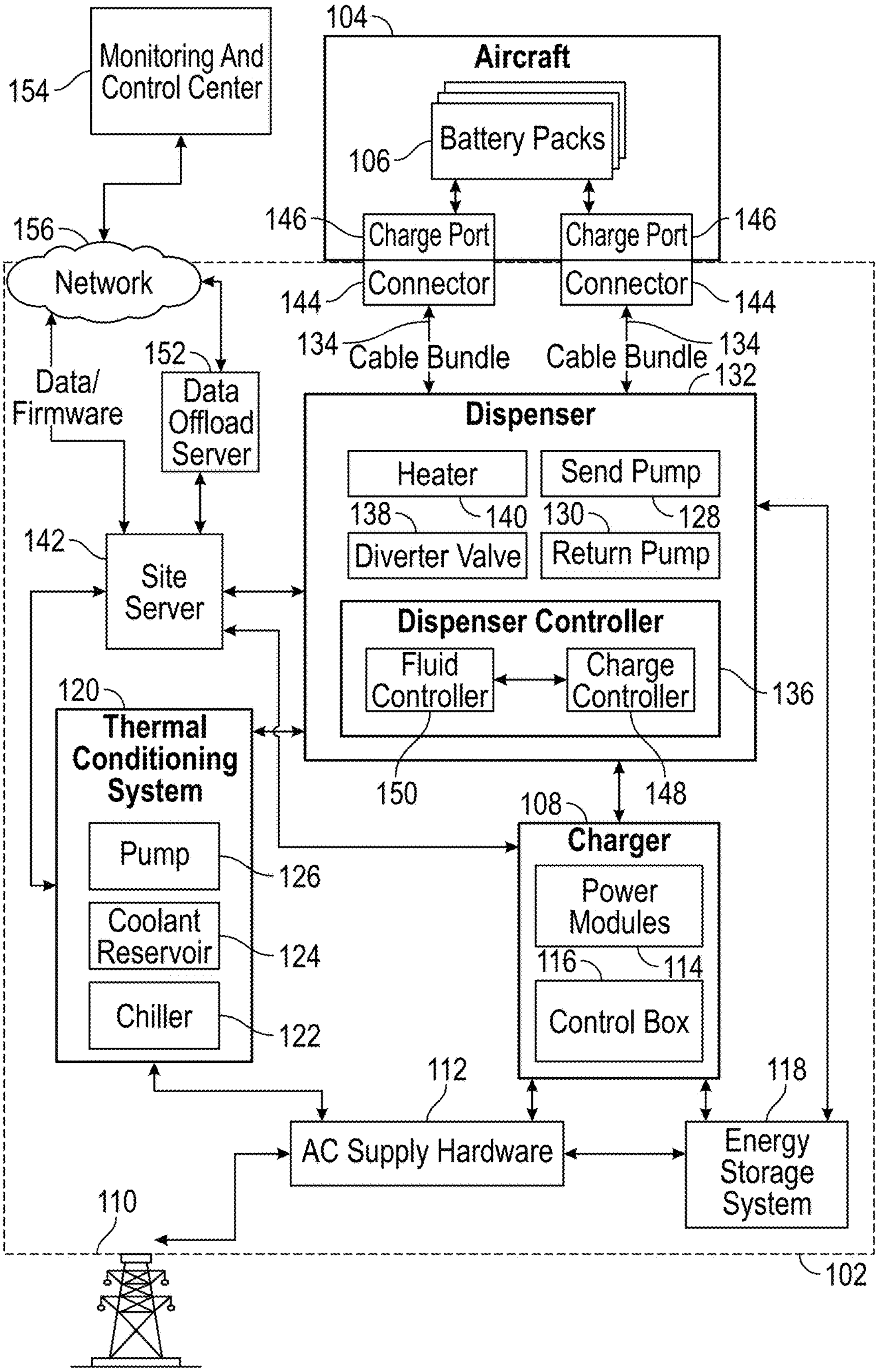
FIG. 1 is a schematic diagram illustrating ground support equipment (GSE), according to some examples, which may provide charging and other support services to multiple electric-powered aircraft.

FIG. 1 is a schematic diagram that illustrates a GSE 102, according to some examples, which is designed to provide charging and other support services to multiple electric-powered aircraft 104. The example GSE 102 enables the rapid charging of the battery packs 106 of the electric aircraft 104, thereby enhancing the efficiency and operational readiness of the aircraft.

The GSE 102 comprises several components that contribute to efficient charging and support services. A charger 108 receives electrical charge from a power supply network 110, via AC supply hardware 112, and distributes it to charge the battery packs 106 of the aircraft 104. The charger 108 is designed with a modular architecture that can be configured for different aircraft battery configurations, thereby providing flexibility and adaptability in its operation.

The charger 108 includes multiple power modules 114 that allow for the independent charging of each of the multiple isolated and redundant battery packs 106 in the aircraft 104. This independent charging capability ensures that each battery pack 106 receives the appropriate amount of charge based on its specific requirements.

A control box 116 serves as the central coordinating unit for the power modules 114, orchestrating their operation so that the charging process is conducted in a safe and effective manner. The control box 116 is designed to manage the interplay of electrical currents, voltages, and temperatures that occur during the charging process, ensuring that each of the power modules 114 operates within its specified parameters. By coordinating the operation of the power modules 114, the control box 116 ensures that each battery pack 106 receives the appropriate amount of charge based on its specific requirements. The control box 116 continuously monitors the status of each of the power modules 114, adjusting their operation as and when deemed beneficial. Furthermore, the control box 116 also plays a role in the safety of the charging process. It is equipped with safety features that monitor the operation of the power modules 114 for anomalies or potential issues. If any such issues are detected, the control box 116 can take action to mitigate the risk, such as by adjusting the operation of the affected power battery module 1002 (FIG. 10) or even shutting the affected battery modules 1002 down if deemed to be beneficial.

The GSE 102 also incorporates a ground-based energy storage system 118. This energy storage system 118 is connected to the power supply network 110, enabling it to receive electrical power efficiently. The connection to the power supply network 110 is facilitated via the AC supply hardware 112, which enables the transfer of electrical charge from the power supply network 110 to the energy storage system 118.

The ground-based energy storage system 118 serves as a backup power source, storing electrical energy that can be used to charge the aircraft's battery packs 106 when the power supply network 110 is unavailable or insufficient. Furthermore, the ground-based energy storage system 118 can also contribute to the overall efficiency of the GSE 102. By storing electrical energy during off-peak hours when electricity rates are lower, and then using this stored energy to charge the aircraft's battery packs 106 during peak hours, the ground-based energy storage system 118 can help to reduce the overall energy costs of the GSE 102.

Another component of the GSE 102 is the thermal conditioning system 120. This system maintains the health and longevity of the battery packs 106 by thermally conditioning them during the charging process. The thermal conditioning system 120 is designed to manage the heat generated by the battery packs 106 during charging so that they remain within the operating temperature range. This is achieved through a cooling process that involves the use of a chiller 122 and a coolant fluid. The thermal conditioning system 120 may provide sufficient cooling capacity to cool battery packs, particularly towards the end of a charging cycle. The cooling of the packs towards the end of the cycle may be helpful for vehicles that do not have active onboard cooling, to ensure that the battery packs are at an optimal or desired temperature before departure from the GSE 102.

The chiller 122 operates to chill the coolant fluid to a specific temperature. This chilled coolant fluid is then stored in a coolant reservoir 124, ready to be circulated through the battery packs 106 during the charging process. The chiller 122 is capable of rapidly chilling the coolant fluid, ensuring that it is ready to be circulated through the battery packs 106 at a moment's notice.

The circulation of the coolant fluid is facilitated by pumps 126 of the thermal conditioning system 120, as well as a send pump 128 and a return pump 130 of one or more dispensers 132. The pumps 126 draw the chilled coolant fluid from the coolant reservoir 124 and circulate it to the dispensers 132 and then through hoses that form part of cable bundles 134. Each cable bundle 134 is a network of hoses and cables that connect the various components of the GSE 102, and is designed to facilitate the transfer of coolant fluid, electrical charge, and data between the GSE 102 and the aircraft 104.

Each dispenser 132 has multiple components including a dispenser controller 136 (e.g., embodied as a main logic board), a send pump 128, a return pump 130, a diverter valve 138, and a heater 140, as well as a number of filters. These components are described in further detail below. Dispensers 132 are also coupled to a site server 142 that regulates the power and coolant flow to one or more aircraft 104. A single site server 142 may operate with the dispenser controllers 136 of a single or multiple dispensers 132.

The coolant fluid is circulated from a dispenser 132 to an internal cooling system of an aircraft 104 via connectors 144, which may include charge handles. These connectors 144 facilitate the transfer of coolant fluid between the GSE 102 and the aircraft 104. They form a shared coolant loop that enables fast battery cooling during charging. For example, the connectors 144 connect to the aircraft's charge ports 146 to facilitate the exchange of data, charge, and coolant between the GSE 102 and the aircraft 104. A cable bundle 134 routes the power, coolant, and data connections from the charger 108, chiller 122, and coolant reservoir 124 to the dispensers 132 and, ultimately, to the connectors 144. The dispensers 132 may also be equipped with docks specifically designed to accommodate the connectors 144 and stow the connectors 144 when not in active use.

A dispenser controller 136, which may be housed within the dispenser 132, is responsible for thermal management and charging process at an individual system level. It orchestrates the operation of one or more dispensers 132. As noted above, each dispenser 132 may be equipped with a send pump 128 that actively sends coolant to the aircraft 104, complemented by another return pump 130 that extracts the coolant, thereby maintaining a regulated flow for optimal thermal management during the charging cycle. Each dispenser controller 136 includes a fluid controller 150 (which controls a thermal conditioning circuit for thermal management) and a charge controller 148 (which controls charging). The fluid controller 150 operates in unison with the charge controller 148 to achieve optimal charging. Fluid control and charge control are tightly coupled. Consider an example situation in which an aircraft that has been sitting overnight in cold temperatures, as a result its batteries are currently 9 degrees C. Upon connection of the GSE 102, the batteries will first be heated up to 40 degrees C. for efficient charging. Then the charging current is ramped up by the charge controller 148, and the fluid controller 150 pumps a small amount of cold coolant to hold the batteries at a steady 40 degrees C. temperature. Once the batteries are nearly fully charged, the charge current is tapered off by the charge controller 148, while the fluid controller 150 ramps up the flow of cold coolant to bring the batteries down to the optimal temperature for the next flight mission (usually near 20 degrees C.).

A site server 142 monitors and controls certain components of the GSE 102. The site server 142 operates with the dispenser controllers 136 to ensure the exchange of data, charge, and coolant to the aircraft 104 while maintaining safe operating temperatures and conditions. The site server 142 and dispenser controllers 136 also control thermal conditioning and charging processes based on feedback from the battery packs 106, optimizing the charging for each specific aircraft. The site server 142 is also tasked with managing power distribution and scheduling across various chargers, ensuring efficient use of resources and adherence to charging timetables. It may operate as a central hub that coordinates the activities of individual chargers, taking into account inputs from the aircraft 104, the dispensers 132, and broader operational requirements.

A data offload server 152 collects and manages data related to the charging operations. This data includes telemetry data from the aircraft 104, status data from GSE 102 components like the thermal conditioning system 120, and information on the charging sessions. The data offload server 152 stores and aggregates the data it collects from the various subsystems of the GSE 102 and the aircraft 104. It can offload or transfer the charging operations data to other systems for purposes such as monitoring, analytics, scheduling, and other applications. This feature enhances the overall management and oversight of the charging operations, contributing to the efficient operation of the GSE 102.

The GSE 102 may be linked to a monitoring and control center 154 via a network 156. The monitoring and control center 154 is equipped with monitoring capabilities that allow it to track the status of various operations and components of the GSE 102 in real time.

By continuously monitoring the charging process and making appropriate adjustments, the monitoring and control center 154 ensures that the battery packs 106 are charged in a manner that maximizes their performance and longevity. This not only enhances the operational readiness of the aircraft but also contributes to the overall lifespan of the battery packs 106, thereby reducing maintenance costs and downtime. Furthermore, the monitoring and control center 154 also plays a role in ensuring the safety of the charging operations.

Thermal Conditioning Circuit 200

Figure 2:
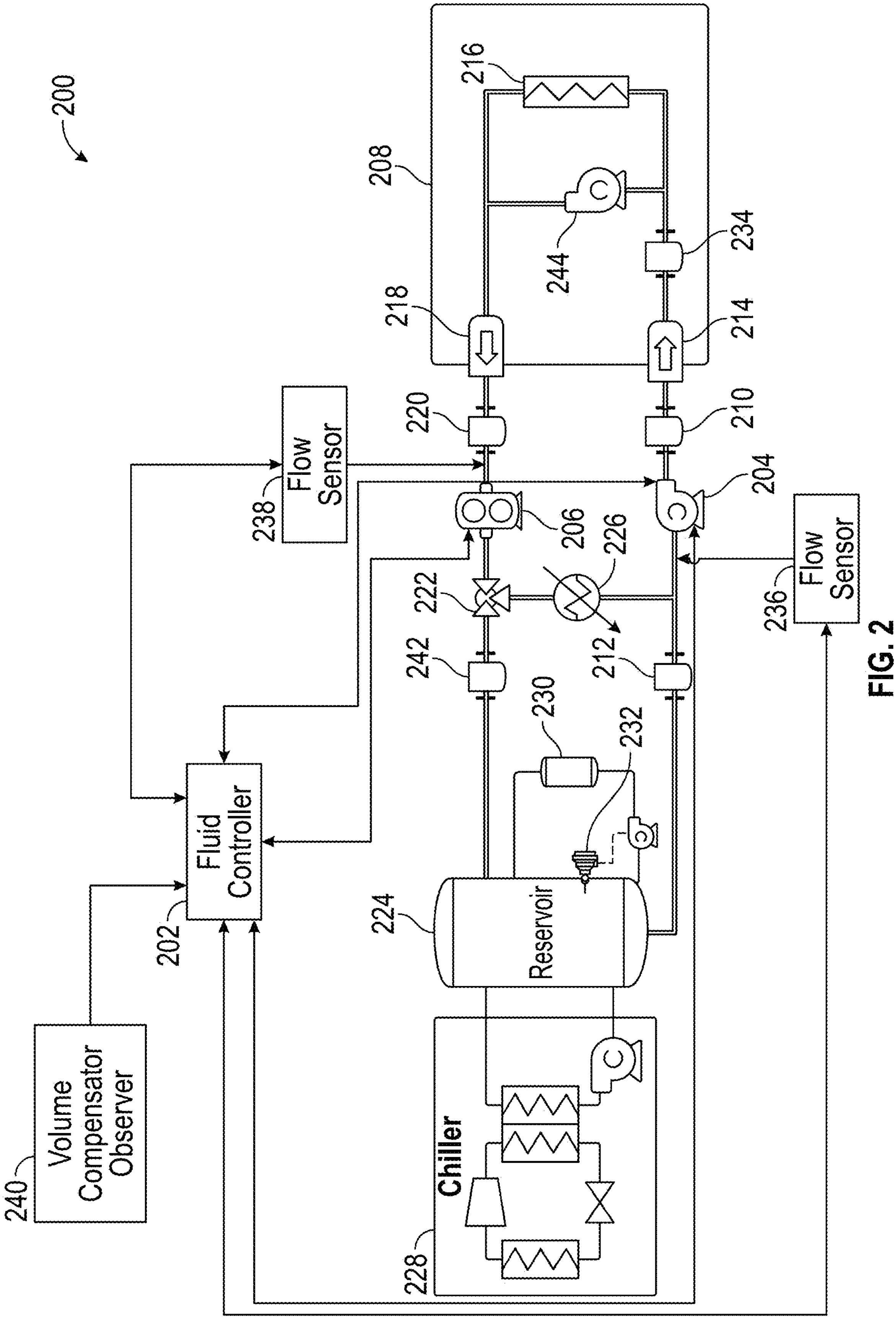
FIG. 2 is a flow diagram showing a thermal conditioning circuit within a thermal management system for electric aircraft, according to some examples.

FIG. 2 is a flow diagram illustrating a coolant flow path in the form of a thermal conditioning circuit 200 of the GSE 102, according to some examples. The diagram provides a detailed view of the components involved in circulating and conditioning the coolant used to manage the temperature of the battery packs during the charging process.

The thermal conditioning circuit 200 includes two pumps, a send pump 204 and a return pump 206, which are responsible for circulating the coolant through the thermal conditioning circuit 200. The send pump 204, for example a centrifugal pump, propels the coolant towards a vehicle 208, while the return pump 206, for example, a positive coarse displacement pump, draws the coolant away from the vehicle 208, ensuring a continuous flow.

Before the coolant is propelled by the send pump 204 through a cable bundle 134 including coolant send conduits 802 and coolant return conduits 804 (shown in FIG. 8), it is pushed through a series of filters to remove particulate matter. A send coarse particulate filter 210 captures larger particles, while a send fine particulate filter 212 removes finer debris, ensuring the cleanliness of the coolant before it enters the aircraft's systems.

The coolant exits a coolant send conduit of the cable bundle 134 and then flows through a send dry-break coupling 214 of a connector 144, which provides a secure connection to the vehicle 208, allowing for the safe transfer of coolant into the battery coolant passages 216. This connection maintains the integrity of the thermal conditioning circuit 200 and prevents contamination or spillage of the coolant.

The coolant is circulated through battery coolant passages 216 of the vehicle 208 (aided by an onboard coolant pump 244) and, having absorbed heat from the battery packs of the vehicle 208, exits the vehicle 208 through another return dry-break coupling 218 of the connector 144 and enters the return side of the thermal conditioning circuit 200. Here, it passes through a return coarse particulate filter 220, which further cleanses the coolant of any impurities picked up during its passage through the vehicle 208.

A diverter valve 222 operatively directs the flow of coolant either back to the coolant reservoir 224 for cooling or through a heater 226 for heating, depending on the thermal requirements of the aircraft. The operation is controlled by a temperature control or adjuster mechanism, in the example form of a fluid controller 202, which allows for precise control of the coolant temperature by mixing flows from the chiller 228 and the heater 226. The diverter valve 222 may be a ball valve, a butterfly valve, a three-way valve, or a rotary valve, for example.

The heater 226, equipped with a heating element, can rapidly increase the temperature of the coolant when necessary. This feature may be particularly useful during colder conditions or when the batteries require pre-heating before charging to reach optimal temperatures (e.g., as indicated by the thermal observer outputs described below).

In some examples, the send pump 204, return pump 206, diverter valve 222, heater 226, send coarse particulate filter

210, and return coarse particulate filter 220 are contained within a dispenser 132, such as that described above with reference to FIG. 1

The chiller 228 maintains coolant stored in the coolant reservoir 224 at a low temperature, for example around −10° C. The chiller 228 ensures that the coolant is sufficiently cold to absorb the heat generated by the battery packs during the charging process. The coolant reservoir 224, which stores the chilled coolant, is designed to hold a large volume of coolant to support continuous operation of the thermal conditioning circuit 200 and to accommodate the thermal load during peak charging periods. In some examples, the coolant reservoir 224 provides additional cooling capacity for fast cooling of the battery packs at the end of a charging session, for example just before the vehicle 208 departs and accelerates (e.g., an electric aircraft takes off, during which rapid battery pack heating may occur).

A return fine particulate filter 242 filters fine grain particulates from coolant flow channeled by the diverter valve 222 to the coolant reservoir 224, from where coolant is circulated by a pump through a chiller 122.

An ion exchange cartridge 230 and a conductivity sensor 232 work together to maintain the chemical quality of the coolant. The ion exchange cartridge 230 removes unwanted ions that could lead to corrosion or scaling within the system, while the conductivity sensor 232 monitors the electrical conductivity of the coolant, providing an indication of its purity and chemical composition.

The ion exchange cartridge 230 may operate in a dedicated deionization loop that circulates to continuously filter the coolant. The ion exchange cartridge 230 may be installed vertically and incorporates non-ionic inhibitors that create a passive layer on metal surfaces to prevent corrosion and ion leaching. This passive layer protection extends to multiple metal types including stainless steel and titanium components within the thermal conditioning circuit 200.

The conductivity sensor 232, for example positioned horizontally to a pipe leading into the coolant reservoir 224, provides continuous monitoring of the coolant's electrical properties. The conductivity sensor 232 may detect changes in conductivity that may indicate contamination or degradation of the coolant mixture. In some examples, the conductivity measurements remain below a threshold (e.g., 5 S/cm) when the system is operating properly. The conductivity sensor 232 works in conjunction with the deionization loop, which activates when conductivity measurements exceed specified thresholds.

A coolant quality monitoring system, including some of the components mentioned above, may implement certain features to maintain proper operation:

- The deionization loop may operate air traps
- Service valves may be positioned on both sides of the ion exchange cartridge 230 for maintenance access
- A drain valve allows servicing of the deionization loop The coolant quality monitoring system integrates with the broader thermal conditioning circuit 200 through:

- Continuous circulation through the deionization loop during system operation.
- Real-time conductivity monitoring for early detection of contamination
- Automated control of the deionization process based on sensor feedback.
- Integration with the fluid controller 202 for system monitoring and control The diagram also includes a filter 234, which may represent an additional stage of filtration or a specific type of filter designed for a particular purpose, such as removing dissolved gases or organic contaminants from the coolant.

Positive Displacement Return Pump 206

As noted above, the thermal conditioning circuit 200 may enable precise coolant volume control in electric aircraft applications. The coolant reservoir 224 stores and maintains the coolant mixture at specified temperatures. The coolant reservoir 224 incorporates a pressure sensor at its base and a level sensor to measure coolant height, enabling a controller to calculate coolant density and monitor the glycol-to-water ratio.

As also noted above, the thermal conditioning circuit 200 employs one or more pumps working in coordination. In some examples, the send pump 204 is a centrifugal pump that operates as the primary flow generator, capable of running at high flow rates to rapidly deliver coolant to the vehicle 208. In some examples, the return pump 206 is a positive displacement pump, implemented as a gear pump in some examples, which creates precise variable flow resistance in the return path. This dual-pump configuration may enable faster and more precise volume control compared to traditional mechanical valve systems.

An example positive displacement return pump 206 may have specific protection measures due to its gear-based design. A filtration system, including filter 234, removes particulates that could damage the pump's internal components. The gear pump configuration may provide a faster volume control response compared to mechanical valves while maintaining precise flow regulation.

A fluid controller 202 manages the coordinated operation of both pumps. The fluid controller 202 receives input from multiple sensors, including flow sensors (e.g., send line flow sensor 236 and return line flow sensor 238) positioned in both the send and return lines. These sensors provide real-time flow rate data that allows the fluid controller 202 to determine volume changes based on the difference between send and return flow rates.

The flow sensors 236 and 238 may continuously monitor the coolant movement through both the send and return lines, providing real-time data to the fluid controller 202. This data enables accurate tracking of volume changes and allows the fluid controller 202 to make rapid adjustments to maintain desired coolant volumes. The thermal conditioning circuit 200 can transition between different operating modes based on thermal requirements while maintaining precise volume control throughout the charging process.

The flow sensors 236 and 238 in the thermal conditioning circuit 200 may implement electromagnetic flow meter technology. The flow sensors 236 and 238 may provide multiple data inputs to the fluid controller 202, including for example:

- Real-time volumetric flow rates in both send and return lines.
- Differential flow measurements between send and return paths
- Data for calculating instantaneous volume changes within the thermal conditioning circuit 200
- Input for the volume compensator observer calculations The flow sensors 236 and 238 work in conjunction with other monitoring devices, including for example:

- Pressure sensors at multiple points in the thermal conditioning circuit 200 to verify proper flow conditions
- Temperature sensors that enable compensation for thermal effects on flow measurements
- Level sensors in the coolant reservoir 224 that help correlate flow data with actual system volumes The fluid controller 202 may process this flow sensor data to:

- Calculate real-time volume changes in the aircraft cooling system
- Determine appropriate pump speed adjustments
- Monitor for flow anomalies that might indicate system issues
- Provide data to the volume compensator observer 240 when direct volume measurements are unavailable This flow sensors 236 and 238 may further include redundant measurement capabilities, allowing the fluid controller 202 to maintain accurate volume tracking even if one sensor experiences issues.

A volume compensator observer 240 supplements the direct measurements by providing estimated coolant volume data when direct measurement becomes unavailable. This volume compensator observer 240 monitors coolant volume changes and maintains system operation even during sensor interruptions.

The fluid controller 202 operates the centrifugal send pump 204 at high flow rates while adjusting the speed of the positive displacement return pump to regulate coolant volume. This coordinated control enables rapid filling of the aircraft's cooling system while maintaining precise volume management.

The positive displacement return pump 206, in some examples, functions by generating a controlled orifice resistance. This mechanism allows for the manipulation of flow rates and pressures within the system with precision. Unlike systems that rely on mechanical valves to regulate fluid dynamics, this example pump achieves adjustments through speed control. By altering the rotational velocity of its components, the positive displacement return pump 206 can swiftly adapt to varying operational demands without necessitating physical modifications or maintenance interventions associated with moving parts. This offers a more efficient and reliable solution for systems requiring fine-tuned flow management.

Fluid Controller 202

Figure 3:
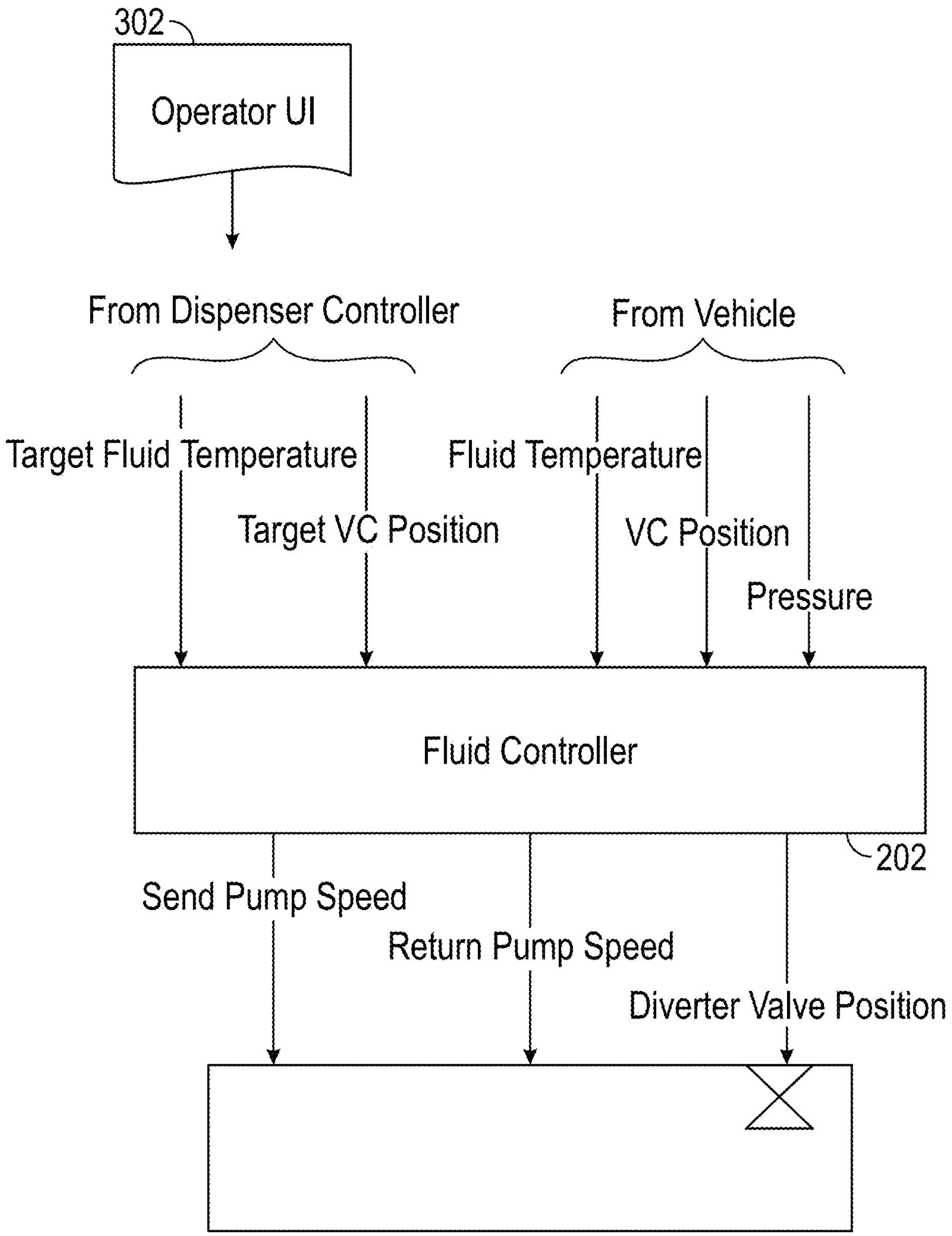
FIG. 3 is a block diagram showing the interaction between a fluid controller and a thermal conditioning circuit within a ground support equipment system, according to some examples.

FIG. 3 is a block diagram illustrating the interaction between a fluid controller 202 and a thermal conditioning circuit 200 (e.g., including a dispenser 132) within the GSE 102 for a vehicle 208 (e.g., an electric aircraft), according to some examples. The diagram provides a detailed representation of the control logic and the flow of information necessary to manage the thermal conditioning of battery packs of the vehicle 208 during a charging process.

The fluid controller 202 serves as a decision-making component for the thermal conditioning circuit 200 and receives input signals from at least two sources: a dispenser controller 136 and the vehicle 208 itself.

From the dispenser controller 136, the fluid controller 202 receives target fluid temperature and target volume compensator (VC) position data. The target fluid temperature is a parameter that dictates the desired temperature of the coolant to be supplied to the aircraft's battery packs. The target VC position may indicate a desired position of a volume compensator within the aircraft, which adjusts to maintain a specific mass of coolant, accounting for temperature-induced volume changes. In some examples, the fluid controller 202 implements a Multi-Input Multi Output (MIMO) Internal Model Control (IMC) scheme that receives set points for coolant inlet temperature and VC fill target and tries to adjust the send and return pump speeds accordingly to achieve those set points.

From the vehicle 208, the fluid controller 202 receives feedback on the actual fluid temperature (T fluid temperature) and the volume compensator (VC) position, as well as the pressure within the thermal conditioning circuit 200. This real-time data allows the fluid controller 202 to assess the current state of the thermal conditioning circuit and make necessary adjustments to achieve the target parameters.

Based on the inputs received, the fluid controller 202 outputs control signals to adjust the send pump speed (e.g., of the send pump 128) and the return pump speed (e.g., of the return pump 206), as well as the position of the diverter valve 222. The send pump speed determines the rate at which coolant is supplied to the aircraft, while the return pump speed controls the rate at which coolant is drawn away from the aircraft. A position of the diverter valve 222 dictates the path of the coolant flow—either directing it through a chiller 228 for cooling or through a heater 226 for heating, or a combination thereof to achieve a specific temperature.

As noted above, the return pump 206, which may be a positive displacement pump situated on the return flow path, may function as a variable valve. This configuration allows for precise control over the volume of coolant within the aircraft's thermal system. Working in concert with the send pump 204, a centrifugal pump responsible for delivering coolant to the aircraft, the return pump 206 enables the regulation of coolant volume on the aircraft. By adjusting the displacement volume of the return pump 206, the system can fine-tune the amount of coolant being drawn away from the aircraft, thereby maintaining a specific thermal condition within the battery packs.

The fluid controller 202, upon receiving inputs from various sensors and the dispenser controller 136, generates output control signals that adjust the operational speeds of both the send pump 204 and the return pump 206. The send pump speed is a parameter that influences the rate at which coolant is introduced into the aircraft's thermal system, directly affecting the rate of heat absorption from the battery packs. Conversely, the return pump speed, modulated by the variable valve functionality of the positive displacement pump, governs the rate at which coolant is extracted from the aircraft. This extraction rate assists in managing the thermal load and ensuring that the coolant retains its capacity to absorb heat on subsequent passes through the battery packs.

The diverter valve 222 is dynamically controlled by the fluid controller 202 to direct the coolant flow through the appropriate thermal management components. When positioned to channel coolant through the chiller 228, the diverter valve 222 facilitates the cooling mode, wherein the coolant is chilled to a predetermined first temperature, suitable for extracting excess heat from the battery packs. If the diverter valve 222 is adjusted to direct coolant through the heater 226, the thermal conditioning circuit 200 enters heating mode, raising the coolant temperature to a second, higher temperature, for warming the battery packs to a specified charging temperature. In scenarios where a specific coolant temperature is required that is neither the chilled nor the heated, the diverter valve 222 can be positioned to allow a proportional mix of coolant from both the chiller 228 and the heater 226, achieving a precise combined temperature appropriate for the thermal management needs of the moment.

The fluid controller 202 may receive and process temperature information from an array of sensors distributed throughout the thermal conditioning circuit 200. These sensors include, but are not limited to, temperature sensors located within both the send and return conduits, such as a coolant send temperature sensor and a coolant return conductor temperature sensor, which provide rapid feedback on the temperature of the coolant as it travels to and from the aircraft.

Additionally, the fluid controller 202 receives data from temperature sensors integrated within the connector 144, for example embedded in a charge handle, which monitor the temperature at this interface between the GSE 102 and a vehicle 208. Temperature sensors within the coolant reservoir contribute to the dataset by tracking the temperature of the stored coolant, ensuring that the chiller 228 and heater 226 are functioning as expected and that the coolant is within the desired temperature range before circulation.

Moreover, the fluid controller 202 interfaces with onboard temperature sensors that are part of the aircraft's thermal management system. These onboard sensors provide information regarding the internal temperature conditions of the battery packs, allowing the fluid controller 202 to make adjustments to the thermal conditioning circuit 200 in real time. By integrating temperature data from multiple points within the thermal conditioning circuit 200, including the send and return paths, the connector interface, the coolant reservoir, and the aircraft itself, the fluid controller 202 can maintain an overview of the thermal state of the entire charging ecosystem.

The fluid controller 202 utilizes this temperature data to modulate the send pump 204 and return pump 206 speeds, as well as to adjust the position of the diverter valve 222, ensuring that the coolant's temperature and pressure meet the battery packs' current thermal requirements. Further, there are logics inside the fluid controller 202 that prevent over- or under-pressure conditions to protect the battery system on the aircraft (e.g., VC and cold plates).

Data Flow 400

Figure 4:
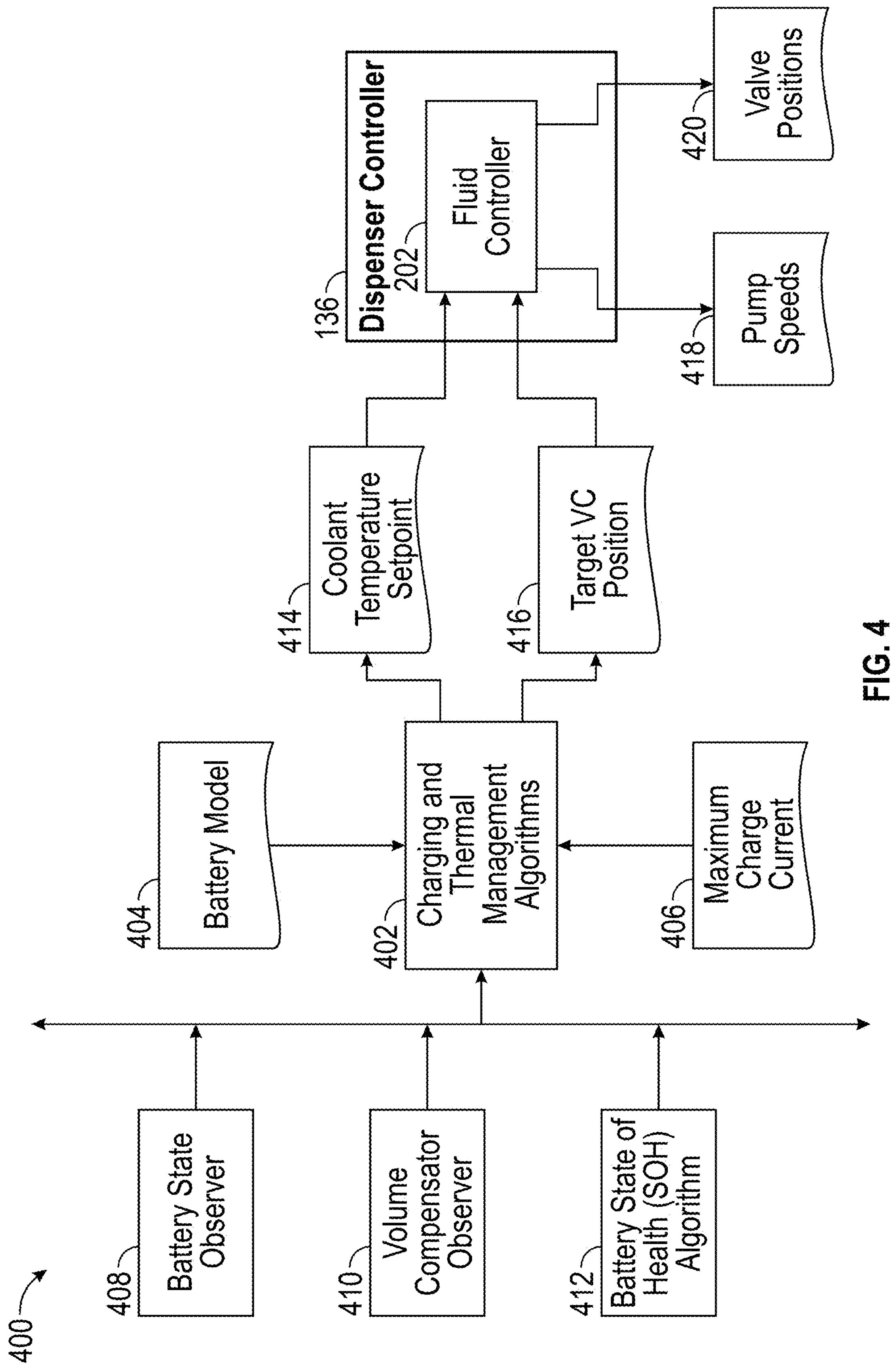
FIG. 4 is a conceptual diagram showing various observers and algorithms that contribute to the charging and thermal management of an electric aircraft, according to some examples.

FIG. 4 is a block diagram that provides a detailed view of data flow 400 for the charging and thermal management systems (e.g., the charger 108 and thermal conditioning system 120) for battery packs of an electric vehicle, according to some examples.

Charging and thermal management algorithms 402 may be executed by the GSE 102 (e.g., by the site server 142) and used to control the charger 108 and the thermal conditioning system 120. The charging and thermal management algorithms 402 may, in some examples where the vehicle is an electric aircraft, balance considerations relating to (1) maintaining optimal battery temperatures for charging and (2) preparing the batteries for aircraft takeoff. This may involve a strategic algorithmic approach to determine an optimal switching time between warming the batteries for efficient charging and cooling them for operational (e.g., takeoff) readiness. The goal may be to minimize the total turnaround time, encompassing both the charging and thermal conditioning phases. This nuanced balance enhances the efficiency and performance of electric aircraft operations.

The charging and thermal management algorithms 402 may receive information from a battery model 404, which encapsulates the electrical and thermal characteristics of the battery packs of a vehicle 208, such as charge acceptance, heat generation rates, and thermal response to charging currents. A maximum charge current 406 input ensures that the charging strategy respects an upper limit of current that the battery can safely handle, which prevents thermal stress and prolongs battery life.

Observers and algorithms that feed into the charging and thermal management algorithms 402 include:

- Battery state observer 408: This observer (or estimator) may use a number of models to estimate various battery state parameters or variables of vehicle batteries that are not directly measured.
  - For example, the battery state observer 408 may use thermal models and empirical data to estimate battery temperature during charging. The thermal models may account for the heat generated internally by the battery cells and the heat exchanged with the surrounding environment. Further, in some examples, the GSE 102 may only measure cell tab temperatures, but it may be desirable to control the charging current based on the minimum cell temperature (which is not measured directly). Hence, a thermal model of the cell and the measurements of tab temperature may be used by the battery state observer 408 to estimate the temperature distribution throughout a cell.
  - The battery state observer 408 may further estimate the battery's state of charge (SOC), providing insights into the remaining charge capacity and the rate at which the SOC changes during charging or discharging, which is vital for planning the charging duration and intensity.
  - The battery state observer 408 may further estimate the internal resistance of the battery cells, which can impact the efficiency of the charging process. The charging and thermal management algorithms 402 may, in some examples, use a resistance estimation to identify an optimal (or near optimal) time to do a "cold shock" on a battery pack to reduce battery temperature for the takeoff of an electric aircraft. In order to determine the optimal time for cold shock, it may be desirable to perform predictive simulation forward, for which resistance estimates may be used.
- Volume compensator observer 410: This observes whether the volume changes in the coolant due to thermal expansion or contraction. It ensures that the coolant volume within the aircraft's thermal system remains constant, preventing overfilling or underfilling that could affect thermal management performance.
- Battery State of Health (SOH) algorithm 412: Evaluates the battery's overall condition, including its ability to hold charge and any degradation that may have occurred over time. This information may be used to adjust the charging strategy to match the battery's current health status.

The outputs generated by the charging and thermal management algorithms 402, informed by the data from the observers, are provided to the fluid controller 202 and may include:

- Coolant temperature setpoint 414: Determines the ideal temperature of the coolant to be supplied to the battery packs, which may vary depending on the phase of the charging cycle and the thermal load from the batteries.
- Target volume compensator (VC) position 416: Specifies the desired position of the volume compensator within the aircraft's thermal management system. This position is adjusted to maintain the optimal volume of coolant, accounting for thermal expansion or contraction due to temperature changes.

The fluid controller 202 then outputs various control values including for example:

- Pump speeds 418: Specifies the operational speeds for the coolant pumps (e.g., the send pump 204 and the return pump 206), which are adjusted to control the flow rate and pressure of the coolant, ensuring efficient heat transfer and maintaining the desired thermal conditions.

Valve positions 420: Dictates the configuration of the system's valves, which can include the diverter valve 222 and other controllable valves within the thermal management system, to direct the coolant flow appropriately for heating, cooling, or maintaining the battery temperature.

Method 500

Figure 5:
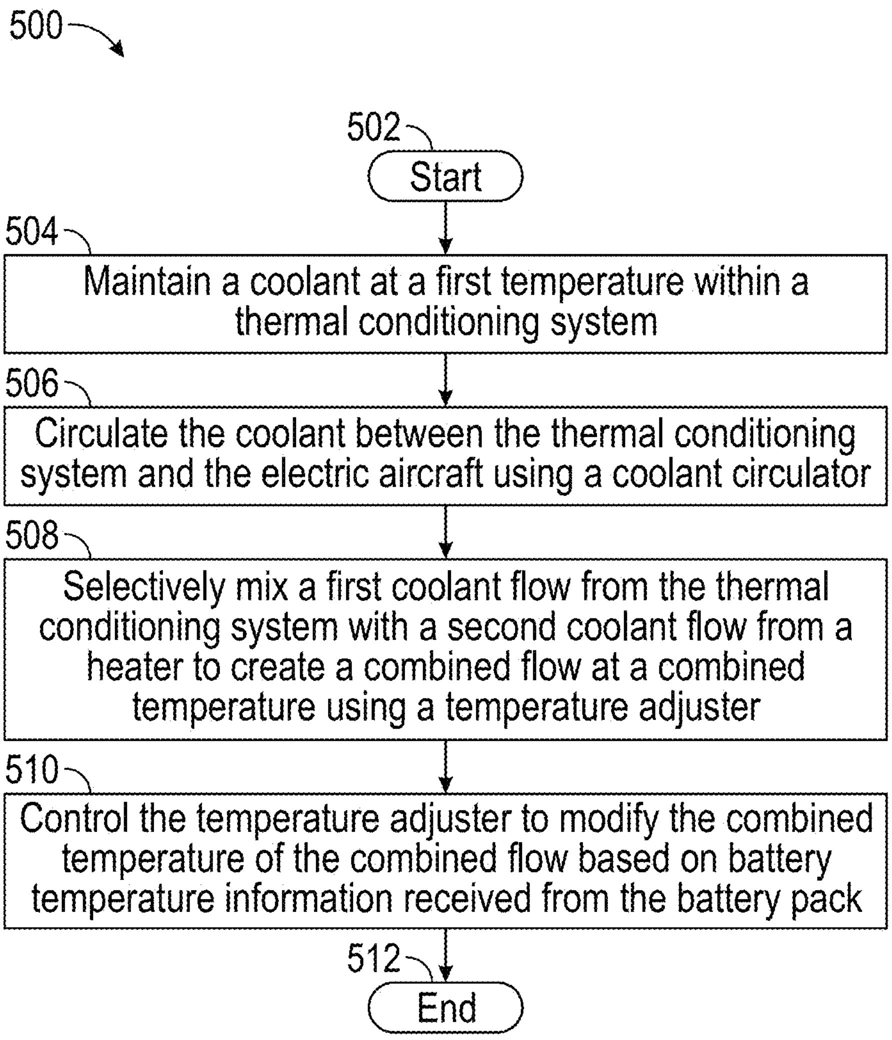
FIG. 5 illustrates a method for managing the temperature of a battery pack in an electric aircraft during a charging process, according to some examples.

FIG. 5 presents a flowchart illustrating a method 500 for managing the temperature of battery packs in an electric vehicle (e.g., aircraft) during the charging process, according to some examples. This method 500 seeks to ensure that the battery packs operate within a specified temperature range, for maintaining battery health and efficiency during charging. The flowchart outlines a series of operations that leverage components and concepts discussed in previous figures, such as thermal conditioning systems, coolant circulators, temperature adjusters, and control units.

The method 500 commences at opening loop block 502. Thereafter:

Maintain a Coolant at a First Temperature (Block 504): The process begins with the system maintaining a coolant reservoir 124 of coolant at a first temperature, which is, for example, chilled to approximately −10° C. within a thermal conditioning system, such as the chiller 122 depicted in FIG. 1. This first temperature is selected to be significantly below the optimal operating temperature of the battery pack. By setting the coolant temperature to this low level, the thermal conditioning system 120 ensures that the coolant has a substantial capacity to absorb heat from the battery pack during the charging process. The chiller 122 operates to cool the coolant stored in the coolant reservoir 124, and this chilled coolant forms the basis for the thermal management system's ability to regulate the battery pack's temperature effectively.

Circulate Coolant (Block 506): Utilizing a coolant circulator, which may include components like the send pump 128 and return pump 130, the thermal conditioning circuit 200 circulates the coolant between the thermal conditioning system 120 and the electric aircraft 104. The circulation of coolant is facilitated through conduits within a cable bundle 134, ensuring a consistent flow of the coolant to and from the battery packs battery pack 106.

Selectively Mix Coolant Flows (Block 508): At this juncture, a temperature adjuster, in the example form of the diverter valve 138, is employed to selectively mix a first coolant flow from the thermal conditioning system 120 with a second coolant flow from the heater 140. This action creates a combined flow at a combined temperature, which can be finely tuned to match the thermal demands of the battery pack. The temperature adjuster is capable of varying the proportion of coolant from the coolant reservoir 124 and the heater 140 to produce the combined flow with the desired temperature characteristics.

Control Temperature Adjuster (Block 510): A control unit, which may be part of the fluid controller 202, receives battery temperature information from the battery pack's management system (BMS). Based on this information, the control unit manipulates the temperature adjuster (e.g., the diverter valve 138) to modify the combined temperature of the combined coolant flow. The control unit's actions are informed by real-time data and are designed to achieve and maintain the battery temperature within a predetermined range suitable for charging.

The method 500 concludes at closing loop block 512, indicating the completion of the temperature management routine. However, the method 500 may include additional dependent operations that further refine the temperature management process:

Use of Temperature Sensors: The system may incorporate temperature sensors (e.g., coolant send temperature sensor 810) positioned within the coolant flow paths to provide real-time temperature data to the dispenser controller 136, including the fluid controller 202. These sensors enable the system to make rapid adjustments to the coolant temperature based on the actual thermal conditions experienced by the battery pack of a vehicle 208 and within the thermal conditioning circuit 200.

Operator Interface: A user interface (e.g., operator UI 302) may be provided to allow an operator to input desired temperature parameters for the battery pack. This interface enables manual override or adjustment of the automated temperature control process, allowing for customized charging protocols as needed. The operator UI 302 may be configured to allow an operator to input desired temperature parameters for battery packs. This feature provides a user-friendly interface for operators to interact with the system and customize the thermal management process according to the specific requirements of the battery pack. The operator UI 302 may include various input devices, such as a keyboard, touchscreen, or voice recognition system, to facilitate the input of the desired temperature parameters.

In some examples, the operator UI 302 receives inputs for target fluid temperature, target volume compensator position, and pressure information. These inputs are then transmitted to a dispenser controller 136 and a vehicle. The dispenser controller 136 processes these inputs and communicates with the fluid controller 202 to determine the appropriate send pump speed, return pump speed, and diverter valve position to achieve the desired thermal conditions. This coordinated operation ensures that the thermal management requirements of the battery pack are met during the charging process.

In some examples, the operator UI 302 may also provide real-time feedback to the operator, displaying information such as the current temperature of the battery pack, the status of the charging process, and any alerts or warnings. This feature enhances the operator's control over the charging process and allows for timely adjustments to the thermal management parameters if any deviations or anomalies are detected.

Mode Operation: The thermal management system is designed to operate in multiple modes to cater to the diverse thermal requirements of the battery pack throughout the charging process. These modes are determined by target temperature parameters, which can be manually input by an operator through a user interface or automatically set by the control unit based on the battery's current state and charging needs. In some examples, the diverter valve 222 operatively transitions the thermal conditioning circuit 200 between these modes by adjusting the flow path of the coolant:

Cooling Mode: In cooling mode, the diverter valve 222 is configured to direct the flow of coolant exclusively through the chiller 228. The chiller 228, which maintains the coolant at the first temperature of approximately −10° C., ensures that the coolant is sufficiently cold to absorb excess heat from the battery pack effectively. As the coolant circulates through the battery pack, it picks up heat, thereby reducing the battery's temperature. The now-warmed coolant is then cycled back to the chiller 228, where it is re-cooled before being sent back to the battery pack. This mode is particularly crucial when the battery pack's temperature exceeds the optimal range for charging or operation, necessitating active cooling to prevent overheating.

Heating Mode: When the battery pack's temperature is below the desired threshold, the system switches to heating mode. In this mode, the diverter valve 222 alters the coolant's flow path to bypass the chiller 228 and instead passes through the heater 226. The heater 226 rapidly warms the coolant to a second temperature, which is higher than the first temperature and tailored to the heating requirements of the battery pack. The heated coolant then flows into the battery packs battery pack 106, transferring heat to the cells and elevating their temperature to a specified range for charging or operation. This mode is helpful in colder environments or scenarios where the battery pack has been subject to low ambient temperatures.

Variable Temperature Mode: The variable temperature mode offers a dynamic and precise approach to thermal management. In this mode, the diverter valve 222 adjusts to a mixed position, allowing for a controlled combination of coolant from both the chiller 228 and the heater 226. By varying the proportion of chilled and heated coolant, the system can achieve a combined flow at a specific combined temperature, which is neither too cold nor too hot but as needed for the battery pack's current needs. This mode may be commanded by the aircraft based on the battery temperature request published by the aircraft's thermal management system. The control unit then calculates the appropriate valve position and pump speeds to achieve the requested temperature, providing a customized thermal management solution.

Adjustments and Decision-Making: The control unit may adjust the combined temperature of the combined flow in response to changes in the charging state of the battery pack. Additionally, the system may incorporate decision-making processes that lead from one step to another, such as determining when to switch from cooling to heating based on the battery's temperature profile.

Method 600

Figure 6:
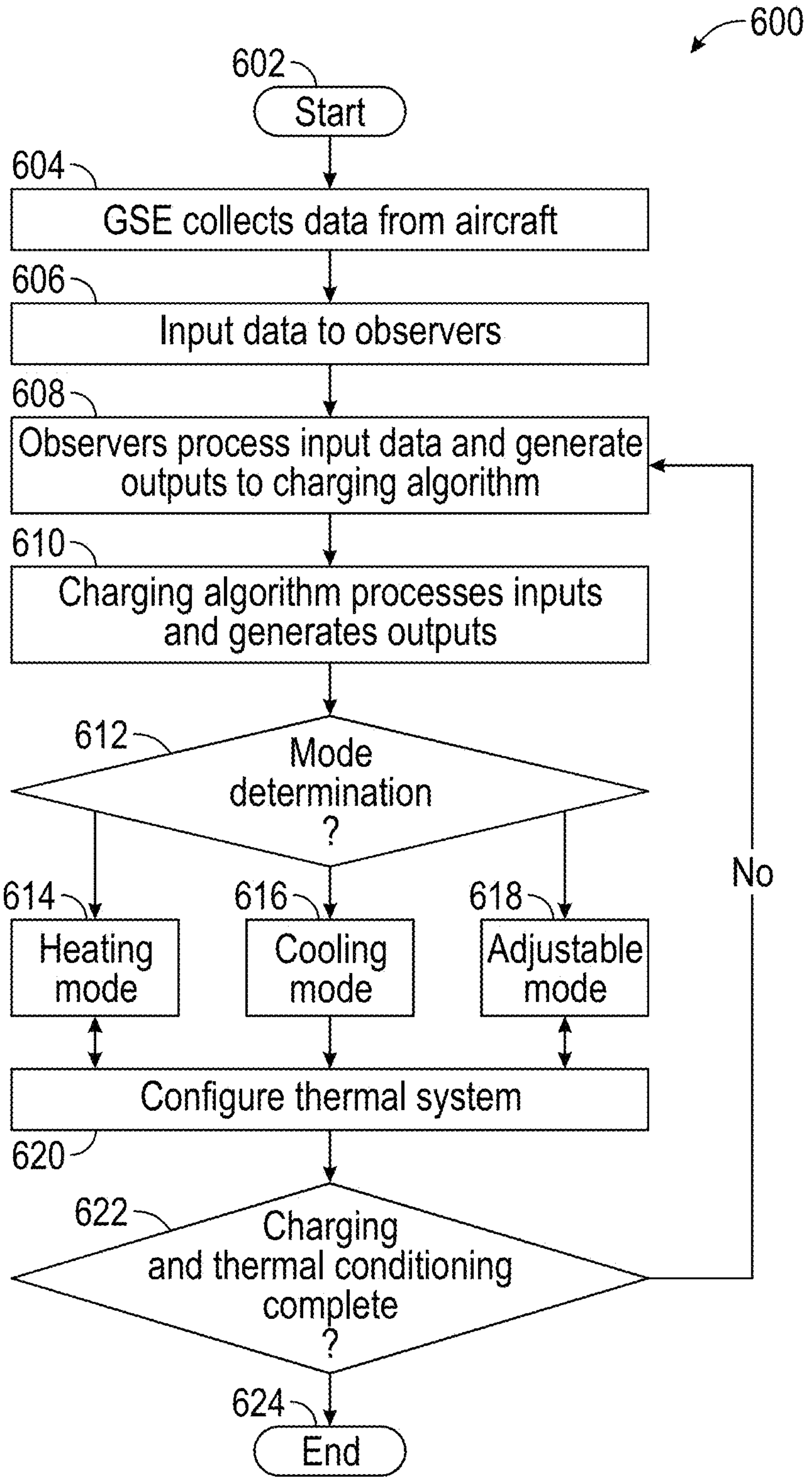
FIG. 6 is a flowchart showing the data processing and mode determination operations within a ground support equipment system for electric aircraft, according to some examples.

FIG. 6 is a flowchart illustrating a method 600 of data processing and mode determination operation within GSE 102 for electric vehicles (e.g., an aircraft), according to some examples.

The method 600 begins at the start block 602 and proceeds through a series of technical operations:

GSE Collects Data from Aircraft (Block 604): The GSE 102, which includes components such as the dispenser controller 136 and the fluid controller 202, initiates the process by collecting data from the aircraft. This data encompasses battery temperature, state of charge (SOC), state of health (SOH), and other relevant parameters that are crucial for determining the thermal management strategy.

Input Data to Observers (Block 606): The collected data is then input into a series of observers. These observers, such as the battery state observer 408 and the volume compensator observer 410 shown in FIG. 4, process the data to generate outputs that inform the charging and thermal management algorithms 402. The observers use technical models and empirical data to predict the battery's behavior during charging and to ensure that the coolant volume is maintained correctly within the aircraft's thermal system.

Observers Process Input Data and Generate Outputs to Charging Algorithm (Block 608): Each observer processes the input data according to its specific function. For example, the battery state observer 408 predicts temperature distribution within the battery cells, while the volume compensator observer 410 ensures the correct mass of coolant is maintained on the aircraft. The outputs from these observers are then fed into the charging and thermal management algorithms 402 to inform the subsequent operations of the thermal management process.

Charging Algorithm Processes Inputs and Generates Outputs (Block 610): The charging and thermal management algorithms 402, which may be executed by the dispenser controller 136, process the inputs from the observers. The algorithms take into account the real-time state of the battery and the thermal requirements to generate a charging profile that includes the coolant temperature setpoint 414 and target volume compensator (VC) position 416. The charging profile is provided to the fluid controller 202, which then outputs pump speeds 418 and valve positions 420.

Mode Determination (Block 612): The thermal conditioning circuit 200 then determines the appropriate mode of operation based on the battery's thermal requirements and the target temperature parameters. The mode determination leads to one of three paths: heating mode, cooling mode, or adjustable mode.

Heating Mode (Block 614): If the battery temperature is below the desired range, the thermal conditioning circuit 200 enters heating mode. The diverter valve 222 is adjusted to direct the flow of coolant through the heater 226, which increases the temperature of the coolant before it is circulated through the battery packs.

Cooling Mode (Block 616): Conversely, if the battery temperature is above the desired range, the thermal conditioning circuit 200 enters cooling mode. The diverter valve 222 directs the coolant through the chiller 228, where it is cooled to the first temperature, typically around −10° C., before being sent to the aircraft.

Adjustable Mode (Block 618): If the battery requires a specific temperature that is not achieved by standard heating or cooling, the thermal conditioning circuit 200 enters adjustable mode. In this mode, the diverter valve 222 allows for a mixture of coolant from both the chiller 228 and the heater 226 to achieve the precise temperature requested by the aircraft.

Configure Thermal System (Block 620): Based on the selected mode, the thermal system is configured accordingly. This involves setting the diverter valve 222 to the correct position and adjusting the send (or feed) and return pump speeds to control the coolant flow rate.

Charging and Thermal Conditioning Complete? (Block 622): The system continuously monitors the charging and thermal conditioning process. If the battery reaches the target temperature and SOC, the process is deemed complete.

The method 600 concludes at the end block 624, indicating the end of the thermal management routine.

Operation of Thermal Conditioning Circuit 200

Figure 7:
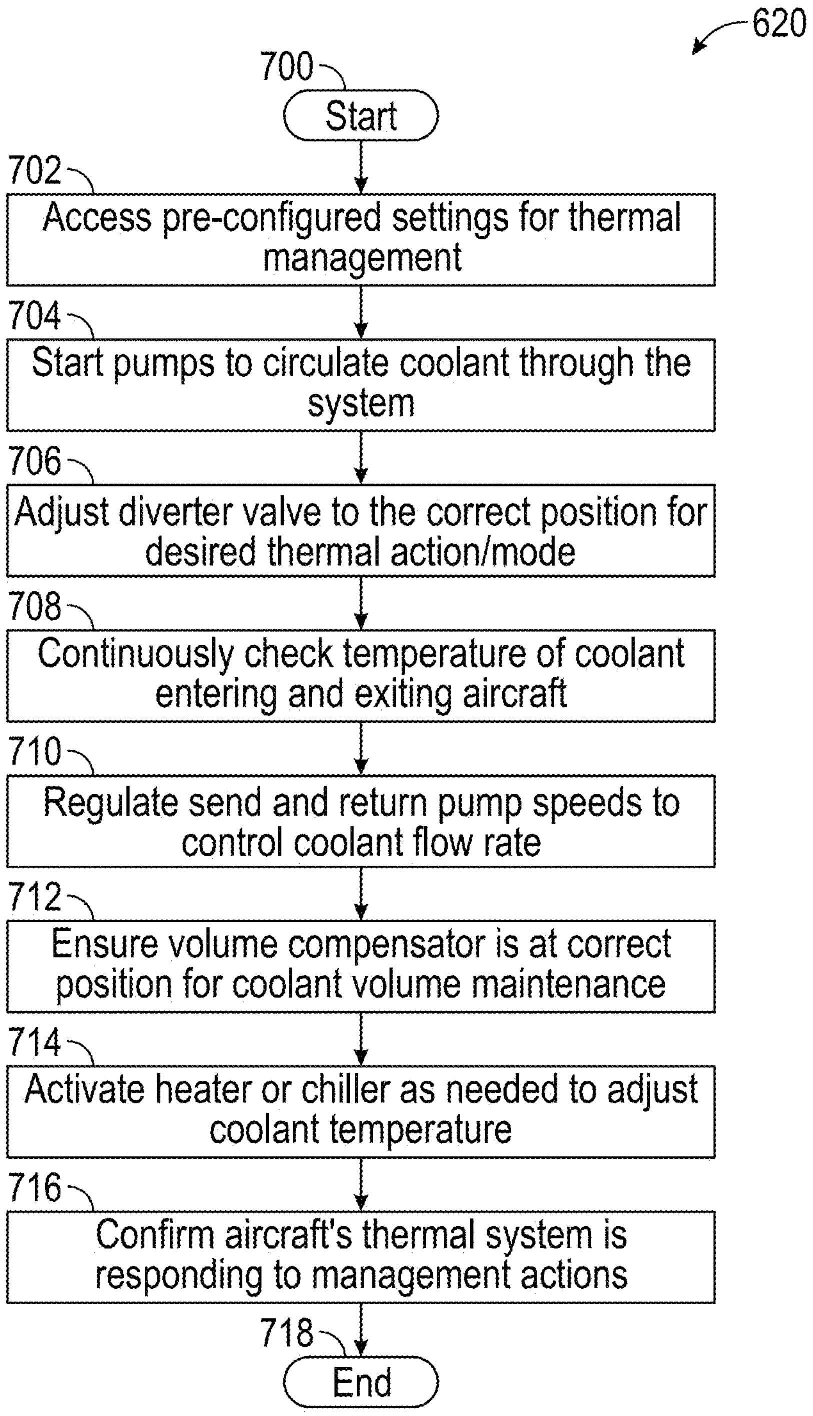
FIG. 7 is a flowchart showing a method to manage the thermal conditions of an electric aircraft using a ground support equipment system, according to some examples.

FIG. 7 is a flowchart illustrating sub-operations of block 620 to configure the thermal conditioning circuit 200, according to some examples.

The sub-operations of block 620 initiates at opening loop block 700 and progresses through a sequence of detailed operations:

Access Pre-Configured Settings for Thermal Management (Block 702): The GSE 102 retrieves pre-configured thermal management settings that have been established based on the specific requirements of the aircraft's battery packs. These settings dictate the desired temperature parameters and the initial conditions for the thermal management process.

Start Pumps to Circulate Coolant Through the System (Block 704): The GSE 102 activates the send pump 204 and the return pump 206 to begin circulating coolant through the thermal conditioning circuit 200. The pumps are responsible for moving the coolant from the thermal conditioning system, which includes the chiller 228 and the coolant reservoir 224, through the cable bundle 134 and into the aircraft's battery coolant passages 216.

Adjust Diverter Valve to the Correct Position for Desired Thermal Action/Mode (Block 706): The diverter valve 138 is adjusted to the appropriate position to achieve the desired thermal action. This may involve directing the coolant through the chiller 228 for cooling, through the heater 226 for heating, or setting the diverter valve 138 to a position that allows for a mixture of both to achieve a variable temperature mode.

Continuously Check Temperature of Coolant Entering and Exiting Aircraft (Block 708): The GSE 102 is equipped with an array of temperature sensors strategically placed throughout the thermal conditioning circuit 200 to provide continuous and precise monitoring of the coolant temperatures. These sensors include the coolant send temperature sensor 810 and the coolant return conductor temperature sensor 812, which are responsible for measuring the temperature of the coolant as it flows into and out of the vehicle 208 respectively.

In addition to these sensors, the thermal conditioning circuit 200 incorporates temperature sensors located within the connector interface, such as those embedded in the charge handle, to monitor the temperature at the point of connection to the aircraft. Temperature sensors within the coolant reservoir 224 track the stored coolant's temperature, ensuring it is ready for circulation. Onboard temperature sensors within the aircraft's thermal management system provide feedback on the internal conditions of the battery packs, allowing for a closed-loop control of the thermal management process.

The real-time data collected from these sensors is relayed to the fluid controller 202, which uses the information to make informed decisions about the operation of the thermal conditioning circuit 200.

By continuously checking the temperatures of the coolant entering and exiting the aircraft, the GSE 102 ensures that the coolant temperature consistently aligns with the thermal management strategy, optimizing the charging process and maintaining the health and efficiency of the battery packs.

Regulate Send and Return Pump Speeds to Control Coolant Flow Rate (Block 710): Within the GSE 102, the fluid controller 202 regulates the speeds of both the send pump 204 and the return pump 206 to manage the flow rate of the coolant with precision. The send pump 204, responsible for propelling the coolant towards the aircraft, and the return pump 206, tasked with drawing the coolant away from the aircraft, are synchronized to ensure a balanced and consistent coolant volume throughout the thermal conditioning circuit 200. By adjusting the pump speeds, the system can finely tune the volume of coolant being circulated, thereby maintaining the desired pressure and flow rate within the coolant circulation system.

The fluid controller 202 leverages real-time temperature data from a network of sensors, including those positioned within the send and return conduits, the connector interface such as the charge handle, the coolant reservoir, and onboard the aircraft. This comprehensive temperature monitoring allows the fluid controller 202 to respond dynamically to the thermal demands of the aircraft's battery packs. For instance, if the temperature sensors indicate an increase in the battery pack's temperature, the fluid controller 202 may increase the send pump speed to deliver more chilled coolant, thereby enhancing the cooling capacity of the system. Conversely, if the battery pack requires less cooling, the return pump speed can be increased to draw more heated coolant away, reducing the cooling effect.

Furthermore, the fluid controller 202 ensures that the coolant's temperature remains within a predetermined range suitable for the battery pack during the charging process. This may be achieved by modulating the diverter valve 222 position to direct the coolant from the coolant reservoir 224 (chilled by the chiller 228) for cooling or from the heater 226 for heating, as required. The precise control of the send and return pump speeds, in conjunction with the temperature adjuster mechanisms, enables the GSE 102 to provide a thermal management solution that adapts to the varying thermal loads experienced during the charging cycle, providing efficient and safe operation of the electric aircraft's battery system.

Ensure Volume Compensator is at Correct Position for Coolant Volume Maintenance (Block 712): The volume compensator observer 410 ensures that a volume compensator within the aircraft's thermal system is at the correct position to maintain the proper volume of coolant. This is to accommodate the thermal expansion or contraction of the coolant as its temperature changes.

Activate Heater or Chiller as Needed to Adjust Coolant Temperature (Block 714): The GSE 102 includes a thermal management system that includes both the heater 226 and the chiller 228 to modulate the temperature of the coolant according to the specific thermal requirements of the electric aircraft's battery packs. Activation of the heater 226 or the chiller 228 (or pulling coolant from the coolant reservoir 224) assists with the delivery of coolant at the specified or desired temperature for efficient charging or for maintaining the battery temperature within a safe operational range.

When the thermal sensors, such as the coolant send temperature sensor 810, the coolant return conductor temperature sensor 812, and additional sensors located within the connector interface and the coolant reservoir 224, detect a need for increased coolant temperature, the fluid controller 202 may activate the heater 226. The heater 226, equipped with a high-capacity heating element, rapidly raises the temperature of the coolant. This heated coolant is then circulated through the aircraft's thermal system, transferring heat to the battery cells and elevating their temperature to the desired level for charging, especially in cold conditions where battery performance may be compromised.

Conversely, if the temperature data indicates that the battery packs are approaching or exceeding their maximum safe operating temperature, the fluid controller 202 may pull coolant from the coolant reservoir 224 and/or activate the chiller 228. The chiller 228, operating as part of the thermal conditioning system, cools the coolant to a lower temperature, often below the ambient temperature, to effectively absorb excess heat from the battery packs. This chilled coolant helps to mitigate the risk of overheating during rapid charging scenarios or in high ambient temperature environments.

Confirm Aircraft's Thermal System is Responding to Management Actions (Block 716): The GSE 102 confirms that the aircraft's thermal system is responding appropriately to the thermal management actions. This involves verifying that the temperature of the battery packs is moving towards the target range and that the system is operating as expected.

The method concludes at closing loop block 718.

Electric Vehicle Charging System 800

Figure 8:
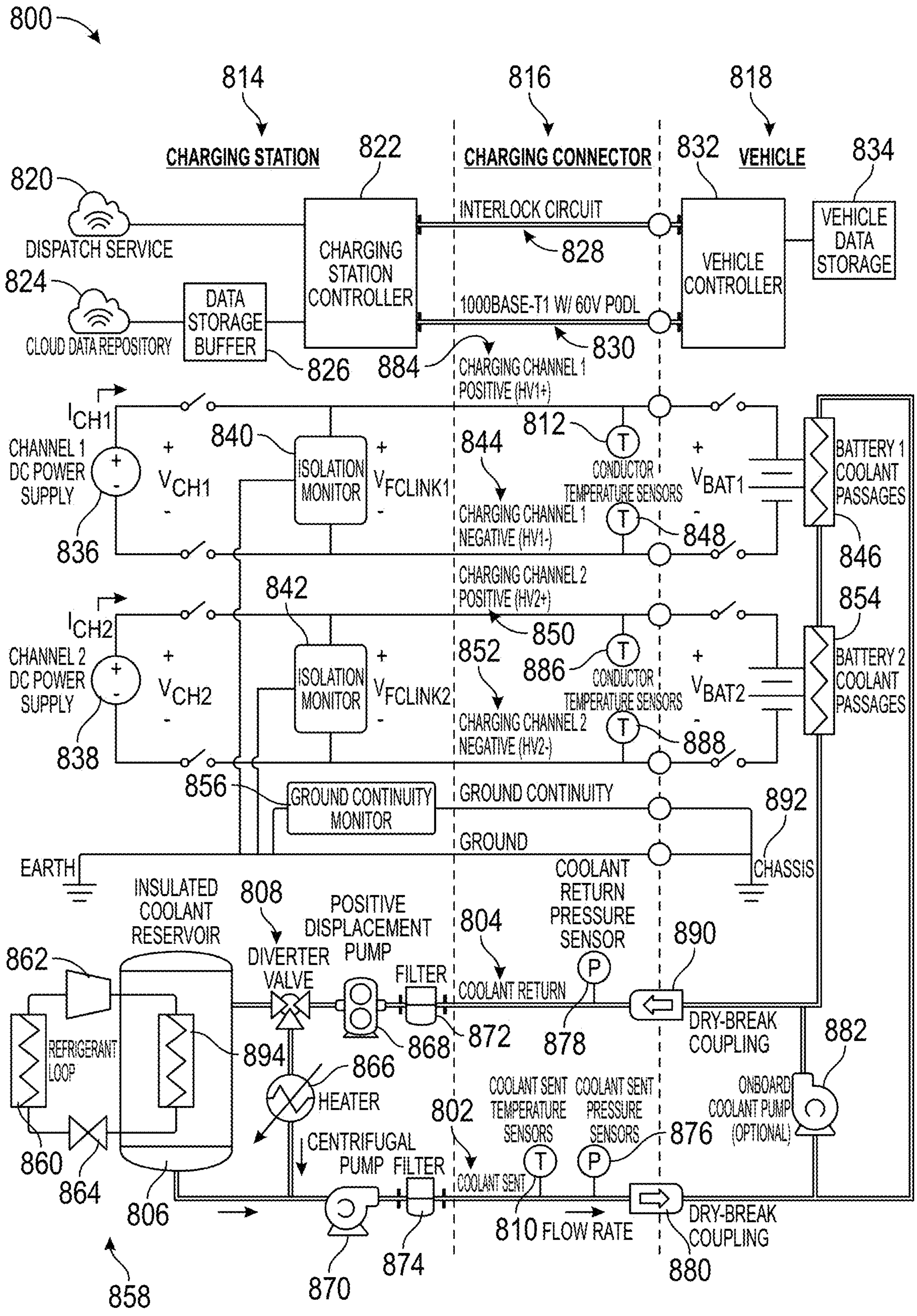
FIG. 8 is a schematic diagram showing an electric vehicle charging system, according to some examples.

FIG. 8 is a schematic diagram illustrating the integration of selected components and systems within an electric vehicle charging system 800, according to some examples, segmented into three primary vertical systems: a charging station 814, a charging connector 816, and a vehicle 818. The diagram is organized to show the control and communication system, two isolated parallel charging circuits, and the thermal conditioning circuit 200, with each component described in relation to its position within these vertical systems.

Control and Communication System

The control and communication system is an integrated network infrastructure that extends across the charging station 814, the charging connector 816, and the vehicle 818. This system ensures synchronized management and communication throughout the charging process, adhering to industry standards for electric aircraft charging.

Dispatch service 820 (charging station 814): Operates as the central command center for charging operations, orchestrating the charging schedules and actively interfacing with the charging station controller 822. It is responsible for the allocation of power resources, timing of charging cycles, and ensuring that the charging station's operations are synchronized with the flight schedules and energy requirements of the electric aircraft fleet. The dispatch service 820 utilizes algorithms to manage the logistics of electric aircraft charging, optimizing the use of infrastructure and minimizing wait times for charging.

Charging station controller 822 or dispenser controller 136 (charging station 814): As the central processing unit of the charging station 814, the charging station controller 822 is tasked with managing the activation of charging circuits and overseeing the thermal conditioning system 120 and dispenser 132. It ensures that the charging process is executed in accordance with the pre-configured settings, which may include parameters such as charging current limits, coolant temperature profiles, and data exchange protocols. The charging station controller 822 dynamically adjusts the charging parameters in real time based on feedback from the vehicle's battery management system and the thermal conditioning circuit, ensuring a safe, efficient, and rapid charging process.

Cloud data repository 824 (charging station 814): This repository serves as a data storage solution that aggregates and processes data generated during charging sessions. It supports the analysis and optimization of the charging process, providing insights into energy consumption patterns, charging efficiency, and vehicle health status. The cloud data repository 824 enables long-term data retention, trend analysis, and predictive maintenance, contributing to the continuous improvement of electric aircraft operations.

Data storage buffer 826 (charging station 814): The data storage buffer 826 acts as an intermediary storage point for data being transferred between the vehicle 818 and the cloud data repository 824. It ensures that large volumes of data, such as detailed flight logs, battery performance metrics, and maintenance records, are temporarily held and batch-processed for transmission over the network. This buffering mechanism is helpful for managing the high-throughput data exchange for the charging system, including the secure offloading of flight data and the uploading of firmware updates.

Interlock circuit 828 (charging connector 816): The interlock circuit 828 is a safety mechanism that ensures a secure mechanical and electrical connection between the charging connector 816 and the vehicle 818. It prevents the flow of high-voltage current until a secure connection is verified, protecting personnel and equipment from potential electrical hazards. The interlock circuit 828 communicates with the charging station controller 822 to signal when it is safe to initiate the charging process, in compliance with the safety protocols outlined in industry standards.

1000BASE-T1 830 (charging connector 816): This connection supports the high-speed Ethernet-based communication protocol utilized within the charging system. The 1000BASE-T1 830 is designed for automotive and aviation applications, enabling robust and reliable data transmission over a single twisted-pair cable. It supports Power over Data Lines (PoDL), allowing for the simultaneous transmission of power and data, which simplifies the system architecture and reduces the complexity of onboard wiring. This protocol enables the real-time exchange of charging control commands, battery status information, and other data between the vehicle controller 832 and the charging station controller 822.

Vehicle controller 832 (vehicle 818): The vehicle controller 832 is the onboard intelligence of the vehicle 818, responsible for managing the charging process from the aircraft's perspective. It communicates with the charging station 814 to regulate the flow of power to the batteries, ensuring that the charging parameters are within the safe operating limits of the aircraft's battery management system. The vehicle controller 832 is designed to be compliant with industry standards, which includes the ability to handle ultra-fast charging, data offloading, and thermal management requirements.

Vehicle data storage 834 (vehicle 818): This onboard data repository captures and stores a comprehensive log of each charging session, including parameters such as the amount of energy transferred, charging duration, temperature profiles, and any anomalies detected during the process. The vehicle data storage 834 is instrumental in providing a historical record for each aircraft, which can be used for post-flight analysis, troubleshooting, and refining the vehicle's charging algorithms. It ensures that a detailed dataset is available for maintenance teams and engineers, aiding in the ongoing enhancement of charging practices and battery management strategies.

Thus, the control and communication system orchestrates the charging process through exchange of information between the vehicle 818 and the charging station 814. The vehicle controller 832 communicates the battery configuration and dynamic charging parameters, such as voltage targets and current limits, to the charging station controller 822. This allows for real-time adjustments to the charging rate based on the battery's thermal conditions and capacity to accept charge. Temperature sensors integrated into the charging connector 816 monitor the conditions of the charging conductors, enabling the charging station 814 (e.g., the fluid controller 150) to adjust the current limit dynamically to prevent overheating. Concurrently, an ethernet connection facilitates the secure offloading of flight data to the charging station 814, which is then stored in the cloud data repository 824 for maintenance and analysis purposes.

The charging station 814 responds to the vehicle's requests for coolant at specific temperatures, flow rates, and inlet pressures, supplying coolant directly from its reservoir or using a diverter valve to achieve the desired temperature.

Isolated Parallel Charging Circuits

The isolated parallel charging circuits are components designed to deliver the necessary power to charge the vehicle's battery packs. These circuits are configured in two isolated channels to provide redundancy and enhance safety during the charging process. For example, the parallel charging circuits may be designed to accommodate the charging of multiple redundant battery packs in an electric aircraft. The electric vehicle charging system 800 is engineered to ensure that each battery pack can be charged independently and safely, leveraging multiple isolated charging circuits. To this end, the charging station 814 orchestrates the charging process and interfaces with the electric aircraft through a charging connector 816, which is designed to handle multiple charging channels.

The vehicle 818 may feature redundant battery packs, as a safety feature for electric aviation. Redundancy in battery packs means that the aircraft is equipped with multiple, isolated battery packs, providing backup power sources in case one fails or underperforms. This redundancy maintains power to critical systems in the event of a battery malfunction. To support the charging of these redundant battery packs, the electric vehicle charging system 800 includes multiple DC Power Supplies, specifically Channel 1 DC power supply 836 and Channel 2 DC power supply 838. Each power supply is connected to its respective battery pack via isolated charging channels, ensuring that the charging process for one battery pack does not interfere with or compromise the charging of another. Isolation monitors 840 and 842 are incorporated into each charging channel to continuously check for electrical isolation between the charging circuit and the aircraft's chassis. This is to prevent potential electrical hazards and to maintain the integrity of each isolated charging circuit.

The charging system is designed to allow charging channels 1 and 2 (or even more channels) to be paralleled within the vehicle for applications with single battery packs. This feature provides flexibility in the charging infrastructure, allowing the system to adapt to different battery configurations and to support aircraft with varying numbers of battery packs. Example components of the charging circuits include:

Channel 1 DC power supply 836 (charging station 814): This power supply unit is responsible for delivering direct current to the first isolated charging circuit. It is engineered to provide ultra-fast charging capabilities, ensuring that the electric aircraft's batteries can be charged in a minimal amount of time while maintaining the integrity and safety of the system.

Isolation monitor 840 (charging connector 816): The isolation monitor 840 is a safety device that ensures electrical isolation between the charging station 814 and the vehicle 818. It continuously monitors the electrical circuit to prevent any unintended conductive connections, thereby ensuring the safety of the charging process and compliance with the prescribed safety standards.

Charging channel 1 positive (HV1+) 884 and negative (HV1−) 844 (charging connector 816): These conductors are responsible for delivering the charging current to the vehicle's battery. The system is designed with parallel channels for applications involving multiple battery pack configurations, providing flexibility and adaptability to various electric aircraft charging requirements.

Conductor temperature sensors 812, 848, 886 and 888 (charging connector 816): These sensors monitor the temperature of the charging connectors 816. By actively measuring the conductor temperatures, the system can prevent overheating and ensure safe charging conditions.

Channel 2 DC power supply 838 (charging station 814): Similar to Channel 1, this power supply provides direct current to the second isolated charging circuit. It operates in parallel with Channel 1 to enhance the charging efficiency and ensure a reliable power supply to the vehicle's batteries.

Isolation monitor 842 (charging connector 816): This device works in conjunction with the isolation monitor 840 to maintain electrical isolation between the charging station 814 and the vehicle 818. It is an additional layer of safety that ensures the charging process is free from electrical hazards.

Charging channel 2 positive (HV2+) 850 and negative (HV2−) 852 (charging connector 816): These conductors function similarly to those in channel 1, supplying the charging current to the vehicle's battery. They are designed to accommodate various electric aircraft configurations, providing a versatile solution for electric aircraft charging.

Ground continuity monitor 856 (charging station 814): This monitor ensures that a proper ground connection is established and maintained via a chassis 892 throughout the charging process, verifying that the electrical grounding is adequate to protect against electrical faults.

Thermal Conditioning Circuit 200

The thermal conditioning circuit 200 is a subsystem of the GSE 102 designed to regulate the temperature of the coolant used in controlling the battery packs' temperature during the charging process. This circuit is meticulously engineered to ensure battery health and charging efficiency, meeting the rigorous specifications of industry standards for electric aircraft charging systems.

Refrigerant loop 858 (charging station 814): The refrigerant loop 858 includes a reservoir 806, heat exchangers 860 and 894, pumps 862, and valves 864. This loop is responsible for the circulation and temperature regulation of the coolant, which directly impacts the thermal management of the aircraft's battery packs during charging.

Heat exchanger 860 (charging station 814): The heat exchanger 860 facilitates the transfer of heat between the coolant and the environment. It operates by allowing the coolant to absorb or dissipate heat, depending on the thermal requirements of the charging process. The heat exchanger 860 is constructed from materials with high thermal conductivity to ensure efficient heat transfer and is dimensioned to handle the thermal loads associated with rapid charging.

Pumps 862 (charging station 814): These pumps 862 are responsible for circulating the coolant between the heat exchanger 860 and the reservoir 806. They are designed to provide a consistent flow and pressure, ensuring the coolant is delivered to the vehicle's battery packs at the correct temperature and flow rate.

Valve 864 (charging station 814): The valve 864 controls the flow of coolant between the heat exchanger 860 and the reservoir 806.

Reservoir 806 (charging station 814): Reservoir 806 serves as the storage unit for the coolant, which is conditioned to the precise temperature specifications for the charging process. It is insulated to minimize thermal losses and is equipped with level sensors to monitor the quantity of coolant available, ensuring a sufficient supply of conditioned coolant is ready for use during the charging process.

Diverter valve 808 (charging station 814): The diverter valve 808 functions to regulate the direction of coolant flow, thereby controlling the temperature of the aircraft's battery packs during the charging cycle.

It incorporates an actuator system, which may be based on electrical, pneumatic, or hydraulic mechanisms, to adjust the valve's position with precision. This actuation is in direct response to control signals from the fluid controller 202 as part of the charging station controller 822. Position sensors integrated into the diverter valve 808 provide real-time feedback on its status, ensuring that the control system can accurately maintain the desired coolant flow path.

In operation, the diverter valve 808 may support the various modes described herein, depending on the specific requirements of the thermal management system. For example, in a scenario where rapid cooling of the battery packs is needed, the diverter valve 808 may pull the coolant exclusively from the cooling system (e.g., from the reservoir 806). Conversely, if the ambient temperature is low and the battery packs require pre-heating, the diverter valve 808 may channel the coolant exclusively through the heater 866 to raise its temperature before it reaches the battery packs.

Where a more nuanced temperature control is required, the diverter valve 808 may be positioned to allow a mixture of coolant from both the reservoir 806/chiller and the heater 866, achieving a precise temperature that matches the thermal demands of the charging process. This mixed-mode operation exemplifies the valve's capability to provide a customized thermal response, enhancing the efficiency of the charging cycle and the operational longevity of the battery packs.

For example, in certain operational scenarios, the diverter valve 808 may operate to achieve a specific coolant temperature through the blending of different coolant flows. Consider a scenario where an electric aircraft's battery packs have been subjected to a series of charge cycles and are now at an elevated temperature. The aircraft is preparing for a subsequent charge cycle, and the battery packs may be brought to a precise temperature that optimizes charging efficiency and battery health. In this scenario, the charging station controller 822, having received information about the battery's current temperature, sends a command to the fluid controller 202 to initiate a temperature blending operation. The fluid controller 202 actuates the diverter valve 808, which is responsible for managing the flow of coolant that may already been warmed by its passage through the aircraft's battery packs.

The diverter valve 808 is capable of diverting all, none, or a portion of this return coolant flow—referred to as the diverted coolant flow—away from the return coolant flow and from flowing directly back into the reservoir 806. Instead, the diverted coolant flow is directed through the heater 866, where it may be further heated to a higher, predetermined temperature set by the thermal management system.

After the diverted coolant flow is heated by the heater 866, it is then blended or mixed into the send coolant flow. The send coolant flow comprises the initial send coolant from the reservoir 806 in addition to any heated, diverted coolant flow from the heater 866.

The diverter valve 808 thus enables precise control over the temperature of the send coolant flow by adjusting the amount of diverted coolant flow that is heated and subsequently mixed in. The proportion of the diverted coolant flow that is mixed with the initial send coolant flow from the reservoir 806 is modulated by the position of the diverter valve 808, which is tuned to achieve the desired temperature of the combined send coolant flow.

Temperature sensors 810 within the coolant send conduit 802 continuously monitor the temperature of the combined send coolant flow. If the sensors detect a temperature variance from the target, they signal the fluid controller 202, which then adjusts the actuation of the diverter valve 808 and/or the pump speeds 418 of the send pump 870 and the return pump 868. The position of the diverter valve 808 may be modified to alter the ratio of the diverted coolant flow to the initial send coolant flow, thereby correcting the temperature of the combined send coolant flow.

The combined send coolant flow is circulated through the aircraft's battery packs, where it can effectively regulate the battery temperature, ensuring it remains within the optimal range for the upcoming charging cycle.

Heater 866 (charging station 814): The heater 866 is used when an increase in the temperature of the coolant is required. It features a high-capacity heating element capable of rapidly elevating the temperature of the coolant to the levels necessary for pre-heating the battery packs or maintaining them within the optimal temperature range. The heater 866 is controlled by the charging station controller 822, which modulates its output to provide precise temperature control.

Return pump 868 (charging station 814): The return pump 868 works in tandem with the send pump 870 to maintain a balanced and continuous flow of coolant through the thermal conditioning circuit 200. It draws the coolant away from the vehicle after it has absorbed heat from the battery packs, ensuring the system's thermal management efficiency.

Send pump 870 (charging station 814): The send pump 870 is responsible for propelling the conditioned coolant flow from the reservoir 806 and/or diverted coolant flow towards the vehicle's battery packs. It ensures the coolant is delivered at the correct pressure and flow rate to maintain the desired thermal conditions.

Filters 872 and 874 (charging station 814): These filters 872, 874 are placed within the coolant flow path to remove particulate matter and contaminants from the coolant. Filter 872 may be a coarse particulate filter, capturing larger particles, while filter 874 may be a fine particulate filter, removing finer debris. Together, they attend to the cleanliness and purity of the coolant for the protection and efficiency of the thermal management system.

Coolant send and return conduits 802 and 804 (charging connector 816): The coolant send and return conduits 802 and 804 are incorporated into the cable bundle 134 and are responsible for transporting the coolant between the charging station 814 and the vehicle 818. These conduits 802, 804 are constructed from materials that provide thermal insulation, ensuring minimal heat loss during coolant transport.

Temperature and pressure sensors 810, 876, and 878 (charging connector 816): These sensors are strategically placed to monitor the temperature and pressure of the coolant within the coolant return conduit 804 and coolant send conduit 802 of the connector 144. Coolant send temperature sensor 810 measures the temperature of the coolant, while coolant send pressure sensor 876 monitors the pressure of the coolant supply. Coolant return pressure sensor 878 measures the pressure of the coolant return, providing a view of the thermal management system's performance to the charging station controller 822. The data from these sensors is used by the charging station controller 822 for thermal management, enabling real-time adjustments to the coolant flow and temperature, maintaining battery efficiency and longevity.

Dry-break couplings 880 and 890 (charging connector 816): These couplings 880, 882 provide secure and leak-free connections for the charging connector 816 to corresponding charge ports 146 of the vehicles 818. They are designed to prevent coolant spillage and contamination during connection and disconnection, ensuring a clean and efficient thermal management process.

Coolant pump 882 (vehicle 818): The coolant pump 882 is an onboard component of the vehicle 818 that may be utilized to assist in the circulation of coolant through the vehicle 818 and it's battery 1 coolant passages 846 and battery 2 coolant passages 854. The coolant pump 882 can be activated to enhance the flow rate of the coolant, ensuring that the battery packs are maintained within temperature range for charging and operation.

Example Vehicle Overview

Figure 9:
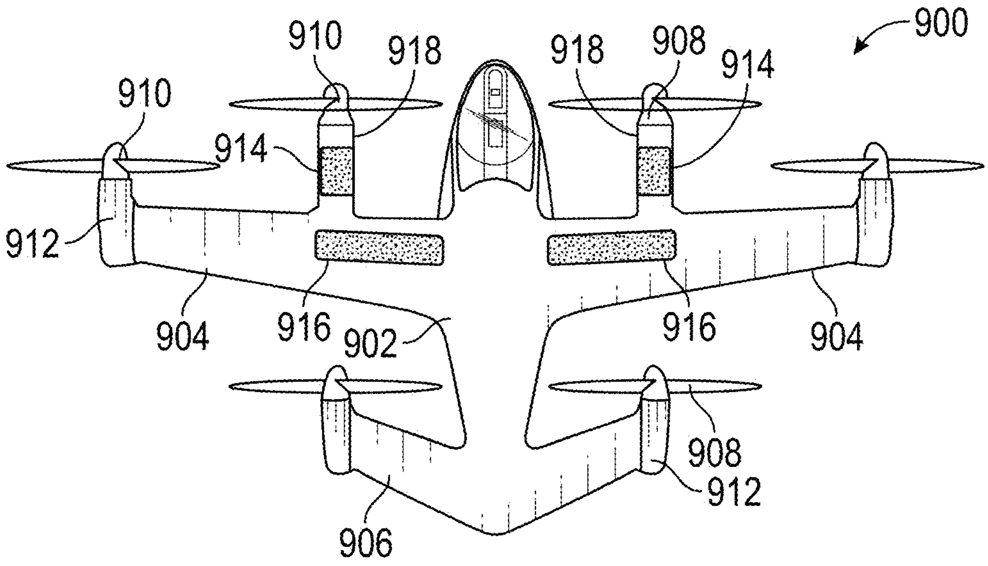
FIG. 9 is a plan view of an aircraft, according to some examples.

FIG. 9 is a plan view of a VTOL aircraft 900 according to some examples. The aircraft 900 includes a fuselage 902, two wings 904, an empennage 906, and propulsion systems 908 embodied as tiltable rotor assemblies 910 located in nacelles 912. The aircraft 900 includes one or more nonlinear and isolated power sources in the example form of battery packs 1004 embodied in FIG. 9 as nacelle battery packs 914 and wing battery packs 916. In the illustrated example, the nacelle battery packs 914 are located in inboard nacelles 918, but it will be appreciated that the nacelle battery packs 914 could be located in other nacelles 912 forming part of the aircraft 900. The aircraft 900 will typically include associated equipment such as an electronic infrastructure, control surfaces, a cooling system, landing gear, and so forth.

The wings 904 function to generate lift to support the aircraft 900 during forward flight. The wings 904 can additionally or alternately function to structurally support the battery packs 1004, battery module 1002, and/or propulsion systems 908 under the influence of various structural stresses (e.g., aerodynamic forces, gravitational forces, propulsive forces, external point loads, distributed loads, and/or body forces, and so forth).

Energy Storage System 1000

Figure 10:
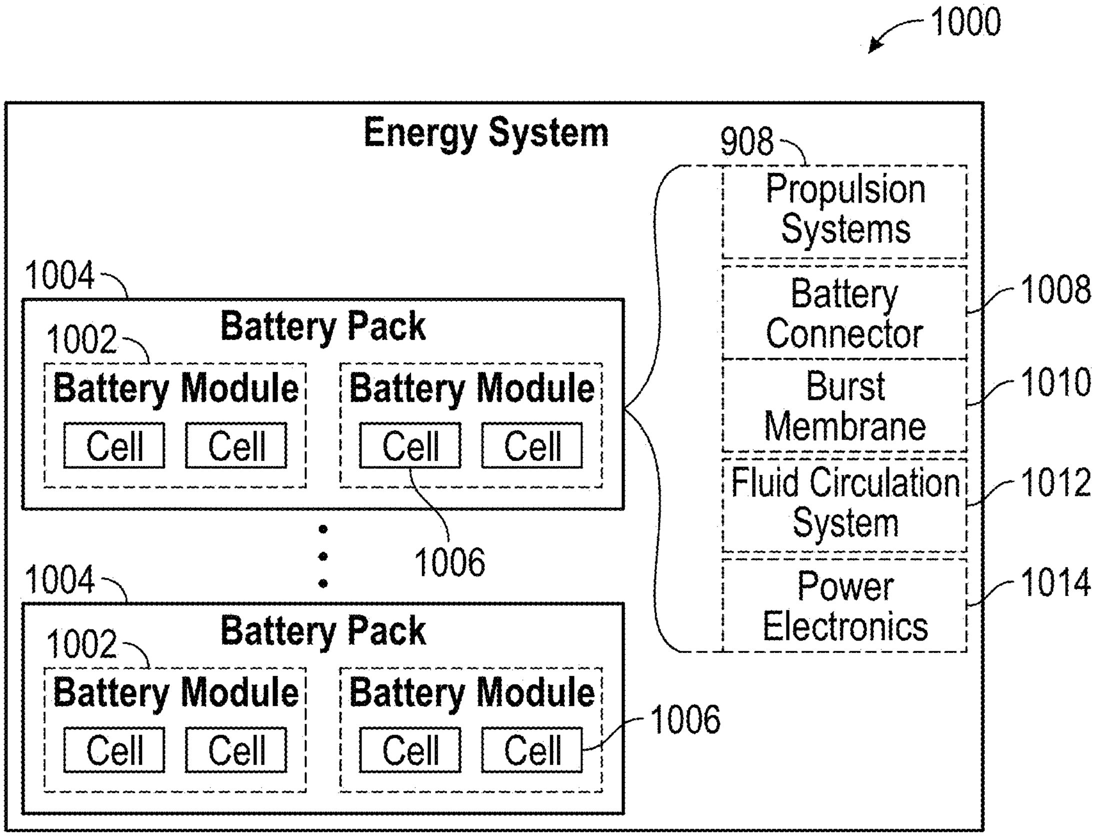
FIG. 10 is a schematic view of an aircraft energy storage system, according to some examples.

FIG. 10 is a schematic view of an aircraft energy storage system 1000 according to some examples. As shown, the energy storage system 1000 includes one or more battery packs 1004. Each battery pack 1004 may include one or more battery modules 1002, which in turn may comprise a number of cells 1006.

Typically associated with a battery pack 1004 are one or more propulsion systems 908, a battery connector 1008 for connecting the battery pack 1004 to the energy storage system 1000, a burst membrane 1010 as part of a venting system, a fluid circulation system 1012 for cooling, and power electronics 1014 for regulating delivery of electrical power (from the battery during operation and to the battery during charging) and to provide integration of the battery pack 1004 with the electronic infrastructure of the energy storage system 1000. As discussed in more detail below, the propulsion systems 908 may comprise multiple rotor assemblies.

The electronic infrastructure and the power electronics 1014 can additionally or alternately function to integrate the battery packs 1004 into the energy storage system 1000 of the aircraft. The electronic infrastructure can include a Battery Management System (BMS), power electronics (HV architecture, power components, and so forth), LV architecture (e.g., vehicle wire harness, data connections, and so forth), and/or any other suitable components. The electronic infrastructure can include inter-module electrical connections, which can transmit power and/or data between battery packs and/or modules. Inter-modules can include bulkhead connections, bus bars, wire harnessing, and/or any other suitable components.

The battery packs 1004 function to store electrochemical energy in a rechargeable manner for supply to the propulsion systems 908. Battery packs 1004 can be arranged and/or distributed about the aircraft in any suitable manner. Battery packs 1004 can be arranged within wings (e.g., inside of an airfoil cavity), inside nacelles, and/or in any other suitable location on the aircraft. In a specific example, the energy storage system 1000 includes a first battery pack within an inboard portion of a left wing and a second battery pack within an inboard portion of a right wing. In a second specific example, the system includes a first battery pack within an inboard nacelle of a left wing and a second battery pack within an inboard nacelle of a right wing. Battery packs 1004 may include a plurality of battery modules 1002.

The energy storage system 1000 includes a cooling system (e.g., fluid circulation system 1012) that functions to circulate a working fluid within the battery pack 1004 to remove heat generated by the battery pack 1004 during operation or charging. Battery cells 1006, battery module 1002, and/or battery packs 1004 can be fluidly connected by the cooling system in series and/or parallel in any suitable manner.

Computer System

Figure 11:
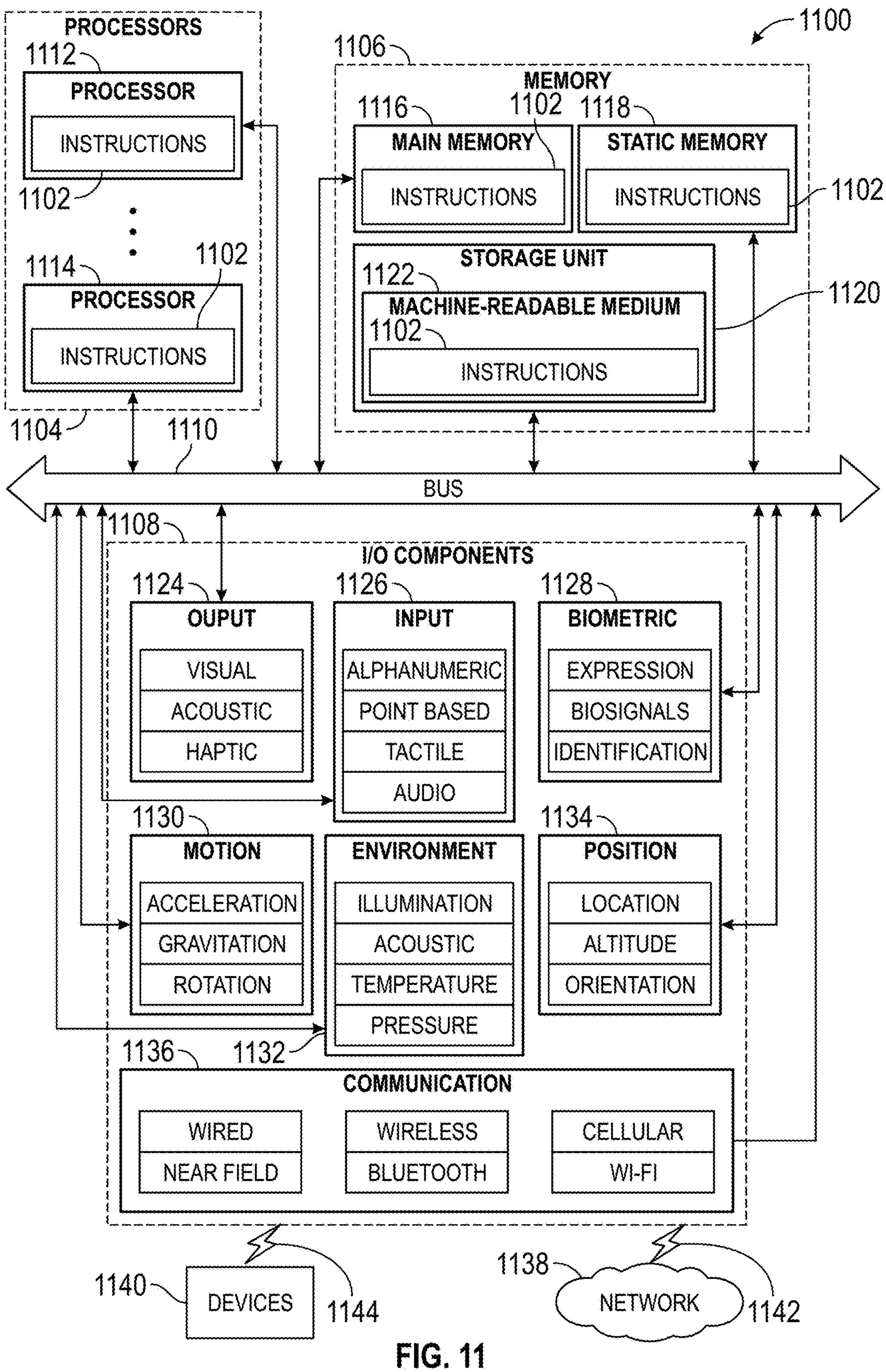
FIG. 11 illustrates a diagrammatic representation of a machine in the form of a computer system within which a set of instructions may be executed for causing the machine to perform any one or more of the methodologies discussed herein, according to some examples.

FIG. 11 shows a diagrammatic representation of a machine 1100 in the example form of a computer system within which instructions 1102 (e.g., software, a program, an application, an applet, an app, or other executable code) for causing the machine 1100 to perform any one or more of the methodologies discussed herein may be executed. The machine 1100 may be any one or more of the controllers (e.g., the dispenser controller 136, fluid controller 150, charge controller 148, or monitoring and control center 154) discussed above.

The instructions 1102 may transform the general, non-programmed machine 1100 into a particular machine 1100 programmed to carry out the described and illustrated functions in the manner described. In some examples, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. Further, while only a single machine 1100 is illustrated, the term "machine" shall also be taken to include a collection of machines 1100 that individually or jointly execute the instructions 1102 to perform any one or more of the methodologies discussed herein.

The machine 1100 may include processors 1104, memory 1106, and I/O components 1108, which may be configured to communicate with each other such as via a bus 1110. In an example, the processors 1104 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1112 and a processor 1114 that may execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single core, a single processor with multiple cores (e.g., a multi-core processor), multiple processors with a single core, multiple processors with multiples cores, or any combination thereof.

The memory 1106 may include a main memory 1116, a static memory 1118, and a storage unit 1120, both accessible to the processors 1104 such as via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones will likely include a touch input device or other such input mechanisms, while a headless server machine will likely not include such a touch input device. It will be appreciated that the I/O components 1108 may include many other components that are not shown in FIG. 11. The I/O components 1108 are grouped according to functionality merely to simplify the following discussion and the grouping is in no way limiting. In various examples, the I/O components 1108 may include output components 1124 and input components 1126. The output components 1124 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1108 may include biometric components 1128, motion components 1130, environmental components 1132, or position components 1134, among a wide array of other components. For example, the biometric components 1128 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 may include acceleration sensor components (e.g., accelerometer), gravitation sensor components, rotation sensor components (e.g., gyroscope), and so forth. The environmental components 1132 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1134 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 may include communication components 1136 operable to couple the machine 1100 to a network 1138 or devices 1140 via a coupling 1142 and a coupling 1144, respectively. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

Executable Instructions And Machine Storage Medium

The various memories (i.e., memory 1106, main memory 1116, static memory 1118, and/or memory of the processors 1104) and/or storage unit 1120 may store data, such as a battery model, and one or more sets of instructions and data structures embodying or utilized by any one or more of the methodologies or functions described herein. These instructions and models (e.g., the instructions 1102), when executed by processors 1104, cause various operations to implement the disclosed examples, such as the various operations discussed above.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various examples, one or more portions of the network 1138 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1138 or a portion of the network 1138 may include a wireless or cellular network, and the coupling 1142 may be a Code Division Multiple Access (CDMA) connection, a Global System for Mobile communications (GSM) connection, or another type of cellular or wireless coupling. In this example, the coupling 1142 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1102 may be transmitted or received over the network 1138 using a transmission medium via a network interface device (e.g., a network interface component included in the communication components 1136) and utilizing any one of a number of well-known transfer protocols (e.g., hypertext transfer protocol (HTTP)). Similarly, the instructions 1102 may be transmitted or received using a transmission medium via the coupling 1144 (e.g., a peer-to-peer coupling) to the devices 1140. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1102 for execution by the machine 1100, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another or may be combined in various ways. All possible combinations and sub-combinations are intended to fall within the scope of this disclosure. In addition, certain method or process blocks, or operations may be omitted in some implementations.

The term "operation" is used to refer to elements in the drawings of this disclosure for ease of reference and it will be appreciated that each "operation" may identify one or more operations, processes, actions, or steps, and may be performed by one or multiple components.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Examples Set 1

Example 1 is a thermal management system for controlling temperature of a battery pack in an electric aircraft during a charging process, the system comprising: a thermal conditioning system to store and maintain coolant at a first temperature; a coolant circulator to circulate the coolant between the thermal conditioning system and the electric aircraft; a temperature adjuster to operatively modify the temperature of the coolant by selectively mixing a first coolant flow from the thermal conditioning system at a selectable temperature with a second coolant flow from a heater at a second temperature to create a combined flow at a combined temperature; and a control unit to receive battery temperature information related to the battery pack and, based at least partially on the battery temperature information, to control the temperature adjuster to modify the combined temperature of the combined flow.

In Example 2, the subject matter of Example 1 includes, wherein the temperature adjuster comprises a diverter valve to control a proportion of the first coolant flow and the second coolant flow to achieve the combined temperature.

In Example 3, the subject matter of Examples 1-2 includes, wherein the control unit includes a processor configured to execute a thermal management algorithm based at least partially on the battery temperature information.

In Example 4, the subject matter of Examples 1-3 includes, wherein the first temperature is below a temperature of the battery pack and the second temperature is above the temperature of the battery pack.

In Example 5, the subject matter of Examples 1-4 includes, wherein the heater is to increase the second temperature of the second coolant flow to a temperature higher than the first temperature.

In Example 6, the subject matter of Examples 1-5 includes, wherein the thermal conditioning system comprises a reservoir configured to hold the coolant and a refrigeration unit to cool the coolant to the first temperature.

In Example 7, the subject matter of Examples 1-6 includes, wherein the coolant circulator comprises a send pump to direct the combined coolant towards the electric aircraft and a return pump to direct the coolant away from the electric aircraft.

In Example 8, the subject matter of Example 7 includes, wherein the return pump is a positive displacement pump configured to function as a variable valve, which, in conjunction with the send pump, regulates a volume of coolant within the aircraft's thermal system to maintain specific thermal conditions.

In Example 9, the subject matter of Examples 1-8 includes, wherein the control unit is further configured to communicate with an aircraft battery management system (BMS) to receive the battery temperature information.

In Example 10, the subject matter of Examples 1-9 includes, a user interface configured to allow an operator to input desired temperature parameters for the battery pack.

In Example 11, the subject matter of Examples 1-10 includes, wherein the system is configured to operate at least one of a plurality of modes, including a cooling mode, a heating mode, or a variable temperature mode, based on target temperature parameters.

In Example 12, the subject matter of Example 11 includes, wherein the system is further configured to transition between the plurality of modes based on thermal requirements of the battery pack during the charging process.

In Example 13, the subject matter of Examples 1-12 includes, wherein the control unit is to adjust the combined temperature of the combined flow in response to changes in a charging state of the battery pack.

In Example 14, the subject matter of Examples 1-13 includes, wherein the system is configured to provide thermal management for a plurality of battery packs simultaneously during the charging process.

In Example 15, the subject matter of Examples 1-14 includes, a plurality of temperature sensors positioned within coolant flow paths of the coolant circulator to provide real-time temperature data to the control unit.

In Example 16, the subject matter of Examples 1-15 includes, wherein the control unit is to receive coolant flow temperature information related to the temperature of current flow within the coolant circulator, and to control the temperature adjuster based at least partially on the coolant flow temperature information.

In Example 17, the subject matter of Examples 1-16 includes, wherein the system is integrated into a ground support equipment (GSE) unit for electric aircraft.

In Example 18, the subject matter of Examples 1-17 includes, a regulation mechanism to maintain consistent pressure within the coolant circulation system.

Example 19 is a method for managing a temperature of a battery pack in an electric aircraft during a charging process, the method comprising: maintaining a coolant at a first temperature within a thermal conditioning system; circulating the coolant between the thermal conditioning system and the electric aircraft using a coolant circulator; selectively mixing a first coolant flow from the thermal conditioning system with a second coolant flow from a heater to create a combined flow at a combined temperature using a temperature adjuster; and controlling the temperature adjuster to modify the combined temperature of the combined flow based on battery temperature information received from the battery pack.

In Example 20, the subject matter of Example 19 includes, wherein maintaining the coolant at the first temperature includes storing the coolant in a reservoir within the thermal conditioning system.

In Example 21, the subject matter of Example 20 includes, wherein circulating the coolant includes using a send pump to direct the coolant towards the electric aircraft.

In Example 22, the subject matter of Example 21 includes, wherein circulating the coolant further includes using a return pump to direct the coolant away from the electric aircraft.

In Example 23, the subject matter of Example 22 includes, wherein the return pump is operated as a variable valve in concert with the send pump to regulate the volume of coolant on the aircraft, thereby maintaining the aircraft's fluid system volume and temperature throughout the charging process until disconnection.

In Example 24, the subject matter of Examples 22-23 includes, wherein selectively mixing the first and second coolant flows includes using a diverter valve as the temperature adjuster.

In Example 25, the subject matter of Example 24 includes, wherein controlling the temperature adjuster includes executing a thermal management algorithm by a processor based on the battery temperature information.

In Example 26, the subject matter of Example 25 includes, wherein the first temperature is maintained below the freezing point of water.

In Example 27, the subject matter of Example 26 includes, wherein the second temperature is maintained above the freezing point of water.

In Example 28, the subject matter of Example 27 includes, positioning a plurality of temperature sensors within coolant flow paths of the coolant circulator to provide real-time temperature data.

In Example 29, the subject matter of Example 28 includes, receiving input desired temperature parameters for the battery pack through a user interface.

In Example 30, the subject matter of Example 29 includes, wherein the system operates in a cooling mode when the first coolant flow is selected.

In Example 31, the subject matter of Example 30 includes, wherein the system operates in a heating mode when the second coolant flow is selected.

In Example 32, the subject matter of Example 31 includes, wherein the system operates in a variable temperature mode based on the desired temperature parameters.

In Example 33, the subject matter of Example 32 includes, adjusting the combined temperature of the combined flow in response to changes in a charging state of the battery pack.

In Example 34, the subject matter of Example 33 includes, wherein the combined temperature is maintained within a predetermined range suitable for the battery pack during the charging process.

In Example 35, the subject matter of Example 34 includes, transitioning between different operating modes based on the battery pack's thermal requirements during the charging process.

In Example 36, the subject matter of Example 35 includes, providing thermal management for a plurality of battery packs simultaneously during the charging process.

In Example 37, the subject matter of Examples 19-36 includes, maintaining consistent pressure within the coolant circulation system using a regulation mechanism.

Example 38 is a computing apparatus comprising: at least one processor; and memory storing instructions that, when executed by the at least one processor, configure the apparatus to perform operations comprising: maintaining a coolant at a first temperature within a thermal conditioning system; circulating the coolant between the thermal conditioning system and the electric aircraft using a coolant circulator; selectively mixing a first coolant flow from the thermal conditioning system with a second coolant flow from a heater to create a combined flow at a combined temperature using a temperature adjuster; and controlling the temperature adjuster to modify the combined temperature of the combined flow based on battery temperature information received from the battery pack.

Example 39 is a non-transitory computer-readable storage medium, the computer-readable storage medium including instructions that when executed by a computer system, cause the computer system to perform operations comprising: maintaining a coolant at a first temperature within a thermal conditioning system; circulating the coolant between the thermal conditioning system and the electric aircraft using a coolant circulator; selectively mixing a first coolant flow from the thermal conditioning system with a second coolant flow from a heater to create a combined flow at a combined temperature using a temperature adjuster; and controlling the temperature adjuster to modify the combined temperature of the combined flow based on battery temperature information received from the battery pack.

Example 40 is at least one machine-readable medium including instructions that, when executed by processing circuitry, cause the processing circuitry to perform operations to implement of any of Examples 1-39.

Example 41 is an apparatus comprising means to implement of any of Examples 1-39.

Example 42 is a system to implement of any of Examples 1-39.

Example 43 is a method to implement of any of Examples 1-39.

Example Set 2

Example 1: A thermal regulation apparatus for managing the thermal environment of an energy storage unit in a vehicle powered by electricity during a power transfer session, the apparatus comprising:

- an environmental conditioning module to retain and stabilize a thermal exchange medium at a baseline temperature;
- a medium propulsion system to transfer the thermal exchange medium between the environmental conditioning module and the vehicle;
- a thermal mixer to operationally alter thermal characteristics of the thermal exchange medium by selectively blending a baseline medium stream from the environmental conditioning module at the baseline temperature with an auxiliary medium stream from a thermal augmentation unit at a secondary temperature to form a unified stream at a resultant temperature; and
- an operational regulator to process temperature-related data from the energy storage unit and, based on the data, to orchestrate the thermal mixer to fine-tune the resultant temperature of the unified stream.

Example 2: The thermal regulation apparatus according to Example 1, wherein the thermal mixer encompasses or alternatively consists of a flow control mechanism to dictate the mix ratio of the baseline medium stream and the auxiliary medium stream to establish the resultant temperature.

Example 3: The thermal regulation apparatus according to Example 1 or 2, wherein the operational regulator comprises or alternatively is equipped with a computational module tailored to execute a temperature optimization protocol that takes into account the temperature-related data.

Example 4: The thermal regulation apparatus according to any preceding Example, where the baseline temperature is determined to be lower than the operational temperature of the energy storage unit, and the secondary temperature is determined to be higher than the operational temperature of the energy storage unit.

Example 5: The thermal regulation apparatus according to any preceding Example, where the thermal augmentation unit is purposed to escalate the secondary temperature of the auxiliary medium stream to surpass the baseline temperature.

Example 6: The thermal regulation apparatus according to any preceding Example, where the environmental conditioning module includes or alternatively is composed of a containment unit for the thermal exchange medium and a thermal reduction device to lower the temperature of the thermal exchange medium to the baseline temperature.

Example 7: The thermal regulation apparatus according to any preceding Example, where the medium propulsion system is comprised of or alternatively includes a forward pump to guide the unified stream towards the vehicle and a reverse pump to route the thermal exchange medium away from the vehicle.

Example 8: The thermal regulation apparatus according to Example 7, where the reverse pump is described as a displacement mechanism configured to double as a flow modulator, which, in synergy with the forward pump, controls the volume of the thermal exchange medium within the vehicle's thermal regulation circuit to preserve designated thermal conditions.

Example 9: The thermal regulation apparatus according to any preceding Example, wherein the operational regulator is further configured to establish a communicative link with or alternatively to interface with an avionics energy management system (EMS) to acquire the temperature-related data.

Example 10: The thermal regulation apparatus according to any preceding Example, further incorporating or alternatively featuring a user interaction console configured to enable an operator to designate preferred thermal settings for the energy storage unit.

Example 11: The thermal regulation apparatus according to any preceding Example, wherein the apparatus is adaptable to operate in one or more of a variety of thermal states, including but not limited to a refrigeration state, a warming state, or a temperature modulation state, depending on specified thermal settings.

Example 12: The thermal regulation apparatus according to Example 11, wherein the apparatus is additionally capable of or alternatively structured to shift among the variety of thermal states in response to thermal needs of the energy storage unit during the power transfer session.

Example 13: The thermal regulation apparatus according to any preceding Example, wherein the operational regulator is configured to recalibrate the resultant temperature of the unified stream in reaction to variations in an electrical charging condition of the energy storage unit.

Example 14: The thermal regulation apparatus according to any preceding Example, wherein the apparatus is designed to deliver thermal regulation to multiple energy storage units concurrently during the power transfer session.

Example 15: The thermal regulation apparatus according to Example 3 or any Example dependent thereon, further including or alternatively equipped with an array of thermal detectors situated within pathways of the medium propulsion system to supply instantaneous thermal readings to the operational regulator.

Example 16: The thermal regulation apparatus according to any preceding Example, wherein the operational regulator is tasked with obtaining medium flow thermal data pertaining to the current temperature within the medium propulsion system, and to direct the thermal mixer based at least in part on the medium flow thermal data.

Example 17: The thermal regulation apparatus according to any preceding Example, wherein the apparatus is integrated into or alternatively forms part of a ground support assembly (GSA) for electrically powered vehicles.

Example 18: The thermal regulation apparatus according to any preceding Example, further comprising or alternatively including a pressure stabilization component to uphold a uniform pressure within the medium propulsion system.

Example Set 3

Example 1 is a thermal management system for an electric vehicle, comprising: a controller configured to: receive battery state information from a battery state observer that estimates battery parameters using thermal models and empirical data during charging; determine a switching time between warming batteries for charging efficiency and cooling batteries for operational readiness based on the battery state information; generate coolant temperature setpoints and control signals to manage battery temperature during the determined switching time; and control a thermal management subsystem to implement the generated setpoints and control signals.

In Example 2, the subject matter of Example 1 includes, wherein the battery state observer is configured to: estimate internal cell temperatures using thermal models and temperature sensor measurements, estimate state of charge based on charging and discharging rates, and estimate internal resistance to determine the optimal switching time.

In Example 3, the subject matter of any one or more of Examples 1-2 includes, wherein the controller is further configured to: receive volume compensator information indicating coolant volume changes due to thermal expansion or contraction; and adjust the control signals based on the volume compensator information to maintain constant coolant volume.

In Example 4, the subject matter of any one or more of Examples 1-3 includes, wherein the controller is further configured to: receive battery health information indicating battery degradation over time; and modify the coolant temperature setpoints based on the battery health information.

In Example 5, the subject matter of any one or more of Examples 1-4 includes, wherein the thermal management subsystem comprises: a thermal conditioning system maintaining coolant at a first temperature; a heater providing coolant at a second temperature higher than the first temperature; a temperature adjuster configured to selectively mix coolant from the thermal conditioning system and the heater; and a coolant circulator configured to circulate the mixed coolant.

In Example 6, the subject matter of any one or more of Examples 1-5 includes, wherein determining the optimal switching time comprises: performing predictive simulations using the estimated internal resistance; calculating total turnaround time for charging and thermal conditioning phases; and selecting a switching time that minimizes the total turnaround time while maintaining battery temperature within operational limits.

In Example 7, the subject matter of any one or more of Examples 1-6 includes, wherein the controller is further configured to: generate pump speed control signals for controlling coolant flow rates; and generate valve position control signals for directing coolant flow between heating and cooling paths.

Example 8 is a method for thermal management of an electric vehicle battery during charging, comprising: receiving, by a controller, battery state information comprising estimated battery parameters determined using thermal models and empirical data; determining an optimal switching time between warming and cooling phases based on the battery state information; generating temperature setpoints and control signals based on the determined switching time; and controlling thermal management components according to the generated setpoints and control signals.

In Example 9, the subject matter of Example 8 includes, wherein receiving battery state information comprises: estimating internal cell temperatures using thermal models and temperature measurements.

In Example 10, the subject matter of any one or more of Examples 8-9 includes, wherein receiving battery state information comprises: estimating state of charge based on charging and discharging rates.

In Example 11, the subject matter of any one or more of Examples 8-10 includes, wherein receiving battery state information comprises: estimating internal resistance of battery cells.

In Example 12, the subject matter of any one or more of Examples 8-11 includes: receiving volume compensator information indicating coolant volume changes; and adjusting the control signals based on the volume compensator information.

In Example 13, the subject matter of any one or more of Examples 8-12 includes: receiving battery health information indicating degradation over time; and modifying the temperature setpoints based on the battery health information.

In Example 14, the subject matter of any one or more of Examples 8-13 includes, wherein determining the switching time comprises: performing predictive simulations using estimated internal resistance; calculating total turnaround time for charging and thermal conditioning; and selecting a switching time that minimizes a vehicle turnaround time.

In Example 15, the subject matter of any one or more of Examples 8-14 includes: selectively mixing coolant flows at different temperatures; and circulating coolant through battery cooling passages.

What is claimed is:

1. A thermal management system for controlling temperature of a battery pack in an electric aircraft during a charging process, the thermal management system comprising:
- a thermal conditioning system to store and maintain coolant at a first temperature;
- a coolant circulator to circulate the coolant between the thermal conditioning system and the electric aircraft;
- a temperature adjuster to operatively modify the temperature of the coolant by selectively mixing a first coolant flow from the thermal conditioning system at the first temperature with a second coolant flow from a heater at a second temperature to create a combined coolant flow at a combined temperature; and
- a control unit to receive battery temperature information related to the battery pack and, based at least partially on the battery temperature information, to control the temperature adjuster to modify the combined temperature of the combined coolant flow.

2. The thermal management system of claim 1, wherein the temperature adjuster comprises a diverter valve to control selective mixing of the first coolant flow and the second coolant flow to achieve the combined temperature.

3. The thermal management system of claim 1, wherein the control unit includes a processor configured to execute a thermal management algorithm based at least partially on estimated battery temperature information generated by a battery state observer.

4. The thermal management system of claim 3, further comprising a plurality of temperature sensors positioned within coolant flow paths of the coolant circulator to provide real-time temperature data to the control unit.

5. The thermal management system of claim 1, wherein the thermal conditioning system comprises a reservoir configured to hold the coolant and a chiller to cool the coolant to the first temperature.

6. The thermal management system of claim 1, wherein:
- the coolant circulator comprises a send pump to direct the combined coolant flow towards the electric aircraft and a return pump to direct the combined coolant flow away from the electric aircraft; and
- the return pump is a positive displacement pump configured to function as a variable valve, which, in conjunction with the send pump, regulates a volume of coolant within a thermal system of the electric aircraft to maintain specific thermal conditions.

7. The thermal management system of claim 1, wherein the control unit is further configured to communicate with an aircraft battery management system (BMS) to receive the battery temperature information.

8. The thermal management system of claim 1, wherein the thermal management system is configured to:
- operate in at least one of a plurality of modes, including a cooling mode, a heating mode, or a variable temperature mode, based on target temperature parameters; and
- transition between the plurality of modes based on thermal requirements of the battery pack during the charging process.

9. The thermal management system of claim 1, wherein the control unit is to adjust the combined temperature of the combined coolant flow in response to changes in a charging state of the battery pack.

10. The thermal management system of claim 1, wherein the control unit is to receive coolant flow temperature information related to the temperature of the combined coolant flow within the coolant circulator, and to control the temperature adjuster based at least partially on the coolant flow temperature information.

11. The thermal management system of claim 1, further comprising a regulation mechanism to maintain consistent pressure within the coolant circulator.

12. A method for managing a temperature of a battery pack in an electric aircraft during a charging process, the method comprising:
- maintaining a coolant at a first temperature within a thermal conditioning system;
- circulating the coolant between the thermal conditioning system and the electric aircraft using a coolant circulator;
- selectively mixing a first coolant flow from the thermal conditioning system with a second coolant flow from a heater to create a combined flow at a combined temperature using a temperature adjuster; and
- controlling the temperature adjuster to modify the combined temperature of the combined flow based on battery temperature information related to the battery pack.

13. The method of claim 12, wherein maintaining the coolant at the first temperature includes storing the coolant in a reservoir within the thermal conditioning system.

14. The method of claim 13, wherein circulating the coolant includes using a send pump to direct the coolant towards the electric aircraft.

15. The method of claim 14, wherein circulating the coolant further includes using a return pump to direct the coolant away from the electric aircraft.

16. The method of claim 15, wherein the return pump is operated as a variable valve in concert with the send pump to regulate a volume of coolant on the electric aircraft, thereby maintaining a fluid system volume during the charging process.

17. The method of claim 15, wherein selectively mixing the first and second coolant flows includes using a diverter valve as the temperature adjuster.

18. The method of claim 17, wherein controlling the temperature adjuster includes executing a thermal management algorithm by a processor based on the battery temperature information.

19. A computing apparatus comprising:
- at least one processor; and
- memory storing instructions that, when executed by the at least one processor, configure the apparatus to perform operations comprising:
- receiving, by a controller, battery state information comprising estimated battery parameters determined using at least one thermal model and empirical data;
- determining a switching time between warming and cooling phases based on the battery state information;
- generating temperature setpoints and control signals based on the determined switching time; and controlling thermal management components according to the generated temperature setpoints and the control signals.

20. The computing apparatus of claim 19, wherein receiving battery state information comprises:

estimating internal cell temperatures using at least one thermal model and at least one temperature measurement;

estimating a state of charge based on charging and discharging rates; and estimating internal resistance of battery cells.

* * * * *